United States Patent
Panwar et al.

(10) Patent No.: US 11,422,768 B2
(45) Date of Patent: Aug. 23, 2022

(54) IMMERSIVE DISPLAY SYSTEM AND METHOD THEREOF

(71) Applicant: Samsung Electronics Co., Ltd., Suwon-si (KR)

(72) Inventors: Sumit Panwar, Noida (IN); Mayur Aggarwal, Noida (IN); Yogesh Kumar, Noida (IN); Gurminder Singh, Noida (IN); Hoseon Kim, Suwon-si (KR); Niyaz N, Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/709,246

(22) Filed: Dec. 10, 2019

(65) Prior Publication Data
US 2021/0048975 A1    Feb. 18, 2021

(30) Foreign Application Priority Data

Aug. 14, 2019    (IN) .............................. 201911032981

(51) Int. Cl.
*G06F 16/40*  (2019.01)
*G06F 3/16*   (2006.01)
*G06T 7/70*   (2017.01)
*G06V 10/25*  (2022.01)

(52) U.S. Cl.
CPC ................ *G06F 3/165* (2013.01); *G06T 7/70* (2017.01); *G06V 10/25* (2022.01); *G06F 16/40* (2019.01)

(58) Field of Classification Search
CPC .... G06F 11/3058; G06F 16/40; G06F 16/433; G06F 16/434; G06F 16/4393; G06F 16/50; G06F 16/60; G06F 16/70; G06F 16/738; G06F 16/739; G06F 16/743; G06F 3/16; G06F 3/165; G06F 3/167; G06T 13/00; G06T 13/20; G06T 13/205; G06T 13/40; G06T 13/60; G06T 13/80; G06T 19/00; G06T 19/003; G06T 19/006; G06T 19/20; G06T 7/10; G06T 7/70
See application file for complete search history.

(56) References Cited

U.S. PATENT DOCUMENTS

| | | | |
|---|---|---|---|
| 10,462,422 B1* | 10/2019 | Harrison | G06Q 10/063114 |
| 2010/0257252 A1* | 10/2010 | Dougherty | G06K 9/00671 |
| | | | 709/217 |
| 2011/0243453 A1* | 10/2011 | Kashima | G11B 27/034 |
| | | | 382/195 |

(Continued)

FOREIGN PATENT DOCUMENTS

| | | |
|---|---|---|
| KR | 10-1235832 B1 | 2/2013 |
| KR | 10-2019-0031033 A | 3/2019 |

OTHER PUBLICATIONS

International Search Report and Written Opinion dated May 11, 2020, issued in International Patent Application No. PCT/KR2019/016858.

(Continued)

*Primary Examiner* — Thomas H Maung
(74) *Attorney, Agent, or Firm* — Jefferson IP Law, LLP

(57) ABSTRACT

An immersive display system is provided. The immersive display system obtains an image and determines external media elements based on the image. The immersive display system renders the external media elements along with the image to provide and immersive display experience to a user.

20 Claims, 41 Drawing Sheets

(56) References Cited

U.S. PATENT DOCUMENTS

| | | | |
|---|---|---|---|
| 2014/0028712 A1* | 1/2014 | Keating | H04N 21/42208 345/633 |
| 2014/0028714 A1 | 1/2014 | Keating et al. | |
| 2014/0082465 A1 | 3/2014 | Jee et al. | |
| 2015/0199975 A1 | 7/2015 | Won et al. | |
| 2015/0373477 A1* | 12/2015 | Norris | H04M 1/72572 381/303 |
| 2016/0048740 A1* | 2/2016 | Winter | G06K 9/00758 382/103 |
| 2016/0124707 A1* | 5/2016 | Ermilov | G06F 3/012 345/156 |
| 2017/0193685 A1* | 7/2017 | Imbruce | G06T 13/205 |
| 2017/0364752 A1* | 12/2017 | Zhou | H04R 1/326 |
| 2018/0012330 A1* | 1/2018 | Holzer | G06T 11/60 |
| 2018/0089935 A1* | 3/2018 | Froy, Jr. | G07F 17/3209 |
| 2018/0143748 A1* | 5/2018 | Ahmed | H04N 21/4312 |
| 2018/0217808 A1* | 8/2018 | Baughman | G06K 9/00302 |
| 2018/0218541 A1* | 8/2018 | Brown, III | H04S 7/303 |
| 2018/0232471 A1* | 8/2018 | Schissler | G06K 9/627 |
| 2018/0374267 A1* | 12/2018 | Yurkin | G06T 11/60 |
| 2019/0107990 A1* | 4/2019 | Spivack | A63F 13/80 |
| 2019/0200158 A1 | 6/2019 | Verbeke et al. | |
| 2019/0222798 A1 | 7/2019 | Honma et al. | |
| 2020/0368616 A1* | 11/2020 | Delamont | A63F 13/25 |

OTHER PUBLICATIONS

Extended European Search Report dated May 25, 2022, issued in European Application No. 19941165.3.

\* cited by examiner

① Camera capture image  ② Scene Analysis - Rain or snow in room window  ③ Scene Immersion - Immerse rain and snow animations

IMMERSIVE DISPLAY SYSTEM AND METHOD THEREOF

CROSS-REFERENCE TO RELATED APPLICATION(S)

This application is based on and claims priority under 35 U.S.C. § 119(a) of an Indian patent application number 201911032981, filed on Aug. 14, 2019 in the Indian Patent Office, the disclosure of which is incorporated by reference herein in its entirety.

BACKGROUND

1. Field

The disclosure relates to displays. More particularly, the disclosure relates to immersive displays.

2. Description of Related Art

Advanced features like always-on display and ambient or auxiliary mode are available on most of the smart devices such as smartphones, tablets, and smart televisions. Although off time of the smartphones has reduced due to increase in continuous usage of the smartphones by users, the off time of other smart devices such as the smart televisions is significantly high. The ambient mode features are used widely in the smart televisions when the users are not actively viewing any content on the televisions.

Presently, conventional smart televisions display various images in the ambient mode. These images are chosen by the smart television randomly and are displayed in no particular order. Also, these images may not correspond to any particular category. As a result, there is no theme or relevance to the displayed images. Such irrelevant images fail to capture the users' attention. Even if the users view a few such images in the ambient mode, the users tend to not have an interest in the images. Further, a relevant image for a smart television at a particular location might not necessarily be relevant for the smart television in another location.

As a result, conventional smart televisions fail to provide useful, pleasing, and relevant experience to the users.

Thus, there is a need for an improved display system and an improved display method that provides a relevant experience for a user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an immersive display system and an immersive display method. This summary is neither intended to identify essential features of the disclosure nor is it intended for use in determining or limiting the scope of the disclosure.

Additional aspects will be set forth in part in the description which follows and, in part, will be apparent from the description, or may be learned by practice of the presented embodiments.

In accordance with an aspect of the disclosure, an immersive display method is provided. The immersive display method includes obtaining an image. A scene analysis module identifies one or more objects in the image. The scene analysis module determines one or more visual characteristics of the identified objects. A prioritization module assigns a priority value to each object based on the corresponding visual characteristics. An audio determination module retrieves, from a database, one or more audio files corresponding to the objects based on the priority values of the corresponding objects. The audio determination module determines one or more audio characteristics associated with the retrieved audio files. An audio composition module processes the audio files to generate dynamic composite audio data based on the audio characteristics of the audio files and the priority values of the objects. The dynamic composite audio data is played via a speaker while the image is displayed.

In accordance with another aspect of the disclosure, an immersive display system is provided. The immersive display system includes a scene analysis module, a prioritization module, an audio determination module, an audio composition module, and a speaker. The scene analysis module is configured to obtain an image and identify one or more objects in the image. The scene analysis module further determines one or more visual characteristics of the objects. The prioritization module is configured to assign a priority value to each object based on the corresponding visual characteristics. The audio determination module is configured to retrieve, from a database, one or more audio files corresponding to the objects based on the priority values of the corresponding objects. The audio determination module further determines one or more audio characteristics associated with the retrieved audio files. The audio composition module is configured to process the audio files to generate dynamic composite audio data based on the audio characteristics of the audio files and the priority values of the objects. The speaker is configured to play the dynamic composite audio while the image is displayed.

In accordance with another aspect of the disclosure, the objects captured in the image and identified by the scene analysis module are objects capable of emitting sound.

In accordance with another aspect of the disclosure, the prioritization module is provided. The prioritization module includes an object classification module and a contextual learning module. The object classification module is configured to receive the visual characteristics of the objects from the scene analysis module and classify the identified objects into audible objects (e.g., objects capable of emitting sound) and non-audible objects (e.g., objects not capable of emitting sound) based on the corresponding visual characteristics. The contextual learning module is configured to calculate the priority value for each audible object based on the corresponding visual characteristics.

In accordance with another aspect of the disclosure, the immersive display system is provided. The immersive display system includes a feedback module. The feedback module is configured to receive feedback from a user. The feedback module further provides the received feedback to the prioritization module.

In accordance with another aspect of the disclosure, the contextual learning module is further configured to receive the feedback and calculate an updated priority value for each audible object based on the corresponding visual characteristics and the received feedback.

In accordance with another aspect of the disclosure, the feedback is one or more of: (i) an attention time of the user, (ii) an eye gaze of the user, (iii) a change in volume level of the dynamic composite audio, (iv) one or more facial expressions of the user, and (v) an active feedback provided by the user.

In accordance with another aspect of the disclosure, the audio determination module is further configured to receive the priority values of the objects and the corresponding visual characteristics and compare the priority values with a predefined confidence score. The audio determination module further retrieves, from the database, the audio files corresponding to the objects having the priority values greater than the predefined confidence score. Thereafter, the audio determination module stores the audio characteristics of the retrieved audio files in the database.

In accordance with another aspect of the disclosure, the immersive display system includes an associative module and a generative module. The associative module is configured to identify one or more regions of interest within the image having the identified objects. The associative module further identifies one or more key objects from among the identified objects based on the visual characteristics of the identified objects. Thereafter, the associative module retrieves, from the database, one or more external dynamic objects corresponding to the key objects. The generative module is configured to generate or define one or more flight paths for the external dynamic objects and render a resulting image such that the external dynamic objects appear to move along the corresponding flight paths within the corresponding regions of interest of the image.

In accordance with another aspect of the disclosure, the key objects identified by the associative module are objects capable of moving in a path in an external environment.

In accordance with another aspect of the disclosure, the scene analysis module is further configured to determine a scene based on the identified objects. Here, the scene corresponds to the information captured in the image.

In accordance with another aspect of the disclosure, the objects include one or more of the following depicted in the image (i) one or more physical objects, (ii) one or more facial expressions of one or more persons, (iii) one or more geographical landmarks, and (iv) one or more predefined persons.

In accordance with another aspect of the disclosure, the visual characteristics of the objects include one or more of: (i) an area occupied by the object on the image, (ii) luminance, (iii) chrominance, (iv) appearance of the object, (v) depth of the object, and (vi) perspective of the image.

In accordance with another aspect of the disclosure, the audio characteristics include one or more of: (i) gain, (ii) amplitude, (iii) sampling frequency, (iv) scale factor, (v) sound interval, (vi) genre, and (vii) pitch.

In accordance with another aspect of the disclosure, the immersive display system includes a sensor module and an ambience analysis module. The sensor module is configured to provide one or more inputs generated by one or more sensors. The ambience analysis module is configured to determine ambience information based on the inputs from the sensor module.

In accordance with another aspect of the disclosure, the prioritization module assigns the priority value to each object based on the corresponding visual characteristics and the ambience information.

In accordance with another aspect of the disclosure, the audio composition module generates the dynamic composite audio based on the audio characteristics of the audio files, the priority values of the objects, and the ambience information.

In accordance with another aspect of the disclosure, the ambience information includes information associated with one or more of: (i) one or more ambient lights, (ii) one or more persons in vicinity of the display, (iii) one or more objects in vicinity of the display, (iii) weather, (iv) one or more events, (v) one or more actions of a user, (vi) time, (vii) time of day, (viii) location, (ix) a predetermined schedule, and (x) contextual information associated to surroundings.

In accordance with another aspect of the disclosure, an immersive display method is provided. The immersive display method includes obtaining an image. A scene analysis module identifies one or more objects in the image. An object determination module determines one or more visual characteristics and one or more audio characteristics of the identified objects. A prioritization module assigns a priority value to each object based on the corresponding visual characteristics and audio characteristics. A media analysis module retrieves one or more external media elements corresponding to the identified objects based on the visual characteristics, the audio characteristics, and the priority values of the identified objects. A display processing module renders the external media elements simultaneously along with the image.

In accordance with another aspect of the disclosure, an immersive display system is provided. The immersive display system includes a scene analysis module, an object analysis module, a prioritization module, a media analysis module, and a display processing module. The scene analysis module is configured to identify one or more objects in the image. The object analysis module is configured to determine one or more visual characteristics and one or more audio characteristics of the identified object. The prioritization module is configured to assign a priority value to each object based on the corresponding visual characteristics and audio characteristics. The media analysis module is configured to retrieve, from a local database, one or more external media elements corresponding to the identified objects based on the visual characteristics, the audio characteristics, and the priority values of the identified objects. The display processing module is configured to render the external media elements simultaneously along with the image.

In accordance with another aspect of the disclosure, the external media elements are at least one of: (i) a dynamic composite audio file, and (ii) an external dynamic object.

In accordance with another aspect of the disclosure, the immersive display system is provided. The immersive display system includes a speaker configured to play the dynamic composite audio file when the image is displayed.

In accordance with another aspect of the disclosure, the immersive display system includes an audio determination module and an audio composition module. The audio determination module is configured to retrieve from a database, one or more audio files corresponding to the objects, based on the priority values of the objects. The audio determination module further determines one or more audio characteristics for the retrieved audio files. The audio composition module is configured to process the audio files to generate dynamic composite audio data based on the audio characteristics of the audio files and the priority values of the objects.

In accordance with another aspect of the disclosure, the objects identified by the scene analysis module are objects capable of emitting sound.

In accordance with another aspect of the disclosure, the immersive display system includes a generative module.

The generative module is configured to render the external dynamic objects on the image.

In accordance with another aspect of the disclosure, the immersive display system includes an associative module. The associative module is configured to identify one or more regions of interest within the image. Here, the regions of interests have the identified objects therein. The associative module is further configured to identify one or more key objects from among the identified objects based on the visual characteristics of the identified objects. Thereafter, the associative module retrieves the external dynamic object from the database, based on the key objects. Here, the external dynamic object being related to the corresponding key objects. Thereafter, the associative module generates or defines one or more flight paths for the external dynamic object.

In accordance with another aspect of the disclosure, the generative module is further configured to render a resulting image such that the external dynamic object appears to move along the corresponding flight paths on the image within the corresponding regions of interest.

In accordance with another aspect of the disclosure, the key objects identified by the associative module are objects capable of moving in a path in an external environment.

In accordance with another aspect of the disclosure, the objects include one or more of the following depicted in the image: (i) one or more physical objects, (ii) one or more facial expressions of one or more persons, (iii) one or more geographical landmarks, and (iv) one or more predefined persons.

In accordance with another aspect of the disclosure, the visual characteristics of the objects include one or more of: (i) an area occupied by the object on the image, (ii) luminance, (iii) chrominance, (iv) appearance of the object, (v) depth of the object, and (vi) perspective of the image.

In accordance with another aspect of the disclosure, the audio characteristics include one or more of: (i) gain, (ii) amplitude, (iii) sampling frequency, (iv) scale factor, (v) sound interval, (vi) genre, and (vii) pitch.

In accordance with another aspect of the disclosure, the immersive display system includes an ambience analysis module. The ambience analysis module is configured to receive one or more sensor inputs from a sensor module and determine ambience information based on the received sensor inputs.

In accordance with another aspect of the disclosure, the prioritization module assigns the priority value to each object based on the corresponding visual characteristics and the ambience information.

In accordance with another aspect of the disclosure, the audio composition module generates the dynamic composite audio based on the audio characteristics of the audio files, the priority values of the objects, and the ambience information.

In accordance with another aspect of the disclosure, the ambience information includes information of one or more of: (i) one or more ambient lights, (ii) one or more persons in vicinity of the display, (iii) one or more objects in vicinity of the display, and (iii) weather, (iv) one or more events, (v) one or more actions of a user, (vi) time, (vii) time of day, (viii) location, (ix) a predetermined schedule, and (x) contextual information associated to surroundings.

In accordance with another aspect of the disclosure, the media analysis module retrieves the external media elements corresponding to the identified objects from an external server when the local database does not contain the external media elements.

In accordance with another aspect of the disclosure, the media analysis module stores the external media elements retrieved from the external server into the local database.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying, in which.

Throughout the drawings, like reference numerals will be understood to refer to like parts, components, and structures.

DETAILED DESCRIPTION

Figure 1:
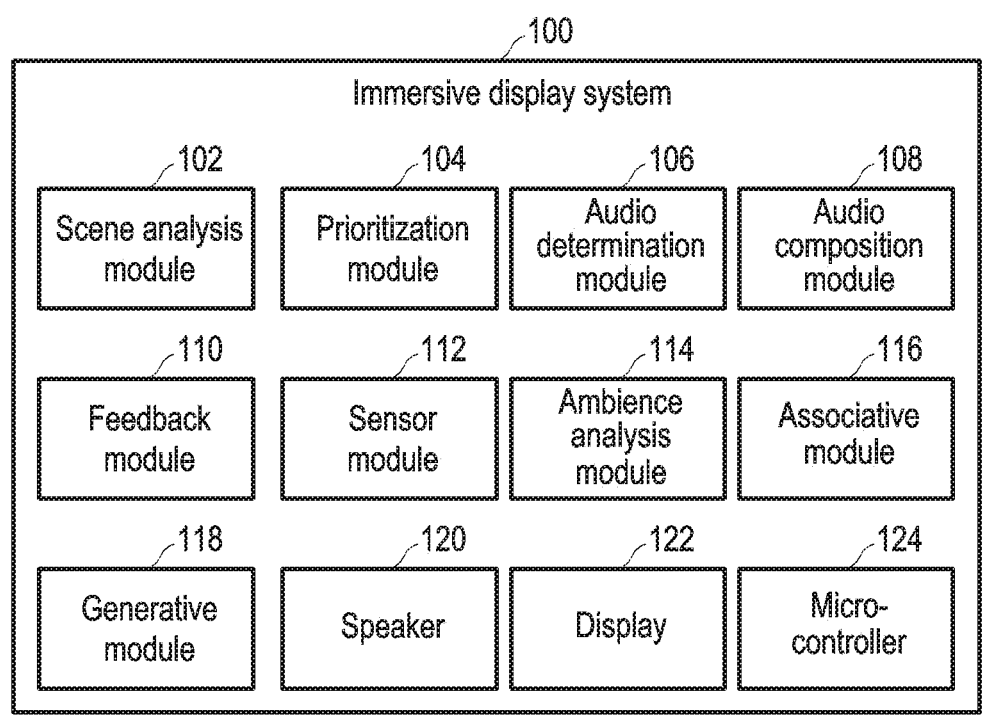
FIG. 1 illustrates a schematic block diagram of an immersive display system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, connections between components and/or modules within the figures are not intended to be limited to direct connections. Rather, these components and modules may be modified, re-formatted or otherwise changed by intermediary components and modules.

References in the disclosure to "one embodiment" or "an embodiment" mean that a particular feature, structure, characteristic, or function described in connection with the embodiment is included in at least one embodiment of the disclosure. The appearances of the phrase "in one embodiment" in various places in the specification are not necessarily all referring to the same embodiment.

The various embodiments of the disclosure provide an immersive display method and an immersive display system.

In an embodiment of the disclosure, an immersive display method is provided. The immersive display method includes obtaining an image. A scene analysis module identifies one or more objects in the image. The scene analysis module determines one or more visual characteristics of the identified objects. A prioritization module assigns a priority value to each object based on the corresponding visual characteristics. An audio determination module retrieves, from a database, one or more audio files corresponding to the objects based on the priority values of the corresponding objects. The audio determination module determines one or more audio characteristics associated with the retrieved audio files. An audio composition module processes the audio files to generate dynamic composite audio data based on the audio characteristics of the audio files and the priority values of the objects. The dynamic composite audio data is played via a speaker while the image is displayed.

In another embodiment of the disclosure, an immersive display system is provided. The immersive display system includes a scene analysis module, a prioritization module, an audio determination module, an audio composition module, and a speaker. The scene analysis module is configured to obtain an image and to identify one or more objects in the image. The scene analysis module further determines one or more visual characteristics of the objects. The prioritization module is configured to assign a priority value to each object based on the corresponding visual characteristics. The audio determination module is configured to retrieve, from a database, one or more audio files corresponding to the objects based on the priority values of the corresponding objects. The audio determination module further determines one or more audio characteristics associated with the retrieved audio files. The audio composition module is configured to process the audio files to generate dynamic composite audio data based on the audio characteristics of the audio files and the priority values of the objects. The speaker is configured to play the dynamic composite audio while the image is displayed.

The objects captured in the image and identified by the scene analysis module are objects capable of emitting sound.

The prioritization module includes an object classification module and a contextual learning module. The object classification module is configured to receive the visual characteristics of the objects from the scene analysis module and classify the identified objects into audible objects (e.g., objects capable of emitting sound) and non-audible objects (e.g., objects not capable of emitting sound) based on the corresponding visual characteristics. The contextual learning module is configured to calculate the priority value for each audible object based on the corresponding visual characteristics.

The immersive display system further includes a feedback module. The feedback module is configured to receive feedback from a user. The feedback module further provides the received feedback to the prioritization module.

The contextual learning module is further configured to receive the feedback and calculate an updated priority value for each audible object based on the corresponding visual characteristics and the received feedback.

The feedback is one or more of: (i) an attention time of the user, (ii) an eye gaze of the user, (iii) a change in volume level of the dynamic composite audio, (iv) one or more facial expressions of the user, and (v) an active feedback provided by the user.

The audio determination module is further configured to receive the priority values of the objects and the corresponding visual characteristics and compare the priority values with a predefined confidence score. The audio determination module further retrieves, from the database, the audio files corresponding to the objects having the priority values greater than the predefined confidence score. Thereafter, the audio determination module stores the audio characteristics of the retrieved audio files in the database.

The immersive display system further includes an associative module and a generative module. The associative module is configured to identify one or more regions of interest within the image having the identified objects. The associative module further identifies one or more key objects out of the identified objects based on the visual characteristics from among the identified objects. Thereafter, the associative module retrieves, from the database, one or more external dynamic objects corresponding to the key objects. The generative module is configured to generate or define one or more flight paths for the external dynamic objects and render a resulting image such that the external dynamic objects appear to move along the corresponding flight paths on the image within the corresponding regions of interest.

The key objects identified by the associative module are objects capable of moving in a path in an external environment.

The scene analysis module is further configured to determine a scene based on the identified objects. Here, the scene corresponds to information captured in the image.

The objects include one or more of the following depicted in the image: (i) one or more physical objects, (ii) one or more facial expressions of one or more persons, (iii) one or more geographical landmarks, and (iv) one or more predefined persons.

The visual characteristics of the objects include one or more of: (i) an area occupied by the object on the image, (ii) luminance, (iii) chrominance, (iv) appearance of the object, (v) depth of the object, and (vi) perspective of the image.

The audio characteristics include one or more of: (i) gain, (ii) amplitude, (iii) sampling frequency, (iv) scale factor, (v) sound interval, (vi) genre, and (vii) pitch.

The immersive display system further includes a sensor module and an ambience analysis module. The sensor module is configured to provide one or more inputs generated by one or more sensors. The ambience analysis module is configured to determine ambience information based on the inputs from the sensor module.

The prioritization module assigns the priority value to each object based on the corresponding visual characteristics and the ambience information.

The audio composition module generates the dynamic composite audio based on the audio characteristics of the audio files, the priority values of the objects, and the ambience information.

The ambience information includes information associated with one or more of: (i) one or more ambient lights, (ii) one or more persons in vicinity of the display, (iii) one or more objects in vicinity of the display, and (iii) weather, (iv) one or more events, (v) one or more actions of a user, (vi) time, (vii) time of day, (viii) location, (ix) a predetermined schedule, and (x) contextual information associated to surroundings.

In an embodiment of the disclosure, an immersive display method is provided. The immersive display method includes retrieving an image. A scene analysis module identifies one or more objects in the image. An object determination module determines one or more visual characteristics and one or more audio characteristics of the identified objects. A prioritization module assigns a priority value to each object based on the corresponding visual characteristics and audio characteristics. A media analysis module retrieves one or more external media elements corresponding to the identified objects based on the visual characteristics, the audio characteristics, and the priority values of the identified objects. A display processing module renders the external media elements simultaneously along with the image.

In another embodiment of the disclosure, an immersive display system is provided. The immersive display system includes a scene analysis module, an object analysis module, a prioritization module, a media analysis module, and a display processing module. The scene analysis module is configured to identify one or more objects in the image. The object analysis module is configured to determine one or more visual characteristics and one or more audio characteristics of the identified object. The prioritization module is configured to assign a priority value to each object based on the corresponding visual characteristics and audio characteristics. The media analysis module is configured to retrieve one or more external media elements corresponding to the identified objects based on the visual characteristics, the audio characteristics, and the priority values of the identified objects. The display processing module is configured to render the external media elements simultaneously along with the image.

The external media elements are at least one of: (i) a dynamic composite audio file, and (ii) an external dynamic object.

The immersive display system further includes a speaker configured to play the dynamic composite audio file when the image is displayed.

The immersive display system further includes an audio determination module and an audio composition module. The audio determination module is configured to retrieve from a database, one or more audio files corresponding to the objects, based on the priority values of the objects. The audio determination module further determines one or more audio characteristics for the retrieved audio files. The audio composition module is configured to process the audio files to generate dynamic composite audio data based on the audio characteristics of the audio files and the priority values of the objects.

The objects identified by the scene analysis module are objects capable of emitting sound.

The immersive display system further includes a generative module. The generative module is configured to render the external dynamic objects on the image.

The immersive display system further includes an associative module. The associative module is configured to identify one or more regions of interest within the image. Here, the regions of interests have the identified objects therein. The associative module is further configured to identify one or more key objects from among the identified objects based on the visual characteristics of the identified objects. Thereafter, the associative module retrieves the external dynamic object from the database, based on the key objects. Here, the external dynamic object being related to the corresponding key objects. Thereafter, the associative module generates one or more flight paths for the external dynamic object.

The generative module is further configured to render a resulting image such that the external dynamic object appears to move along the corresponding flight paths on the image within the corresponding regions of interest.

The key objects identified by the associative module are objects capable of moving in a path in an external environment.

The objects include one or more of the following depicted in the image: (i) one or more physical objects, (ii) one or more facial expressions of one or more persons, (iii) one or more geographical landmarks, and (iv) one or more predefined persons.

The visual characteristics of the objects include one or more of: (i) an area occupied by the object on the image, (ii) luminance, (iii) chrominance, (iv) appearance of the object, (v) depth of the object, and (vi) perspective of the image.

The audio characteristics include one or more of: (i) gain, (ii) amplitude, (iii) sampling frequency, (iv) scale factor, (v) sound interval, (vi) genre, and (vii) pitch.

The immersive display system further includes an ambience analysis module. The ambience analysis module is configured to receive one or more sensor inputs from a sensor module and determine ambience information based on the received sensor inputs.

The prioritization module assigns the priority value to each object based on the corresponding visual characteristics and the ambience information.

The audio composition module generates the dynamic composite audio based on the audio characteristics of the audio files, the priority values of the objects, and the ambience information.

The ambience information includes information of one or more of: (i) one or more ambient lights, (ii) one or more persons in vicinity of the display, (iii) one or more objects in vicinity of the display, (iii) weather, (iv) one or more events, (v) one or more actions of a user, (vi) time, (vii) time of day, (viii) location, (ix) a predetermined schedule, and (x) contextual information associated to surroundings.

In yet another embodiment, the media analysis module retrieves external media external media elements corresponding to the identified objects from an external server when the local database does not contain the external media elements.

In yet another embodiment, the media analysis module stores the external media elements retrieved from the external server into the local database.

FIG. 1, a schematic block diagram of an immersive display system (100) is illustrated according to an embodiment of the disclosure.

Referring to FIG. 1, the immersive display system (100) includes a scene analysis module (102), a prioritization module (104), an audio determination module (106), an audio composition module (108), a feedback module (110), a sensor module (112), an ambience analysis module (114), an associative module (116), a generative module (118), a speaker (120), a display (122), and a microcontroller (124).

The immersive display system (100) may be installed in an electronic device such as, but not limited to, smartphones, tablets, smart televisions, etc. The immersive display system (100) may be implemented on-device in a standalone manner. Alternatively, the immersive display system (100) may implemented on a server or webserver and provided as a web-based service to an electronic device.

In an example, the disclosure is implemented when the electronic device is in ambient mode, i.e., when a user is not actively using the electronic device or content is not selected to be displayed at the electronic device.

The display (122) displays an image. Examples of the display (122) include, but are not limited to, a television screen, a smartphone screen, a smart television screen, and a tablet screen. The display (122) may be Light Emitting Diode (LED), Liquid Crystal Display (LCD), Organic Light Emitting Diode (OLED), Active Matrix Organic Light Emitting Diode (AMOLED), or Super Active Matrix Organic Light Emitting Diode (SAMOLED) screen. The display (122) may be of varied resolutions. It will be understood to a person of ordinary skill in the art that the disclosure is not limited to any type or any resolution of the display (122).

The microcontroller (124) is configured to implement the immersive display method of the disclosure. The microcontroller (124) includes at least one processor and a memory (both not illustrated in FIG. 1). The processor is configured to execute a plurality of machine-readable instructions stored in the memory.

The speaker (120) is configured to play music and/or audio files. Volume and mode of the speaker (120) may be controllable or programmable by a user as per the user's requirements.

Figure 2:
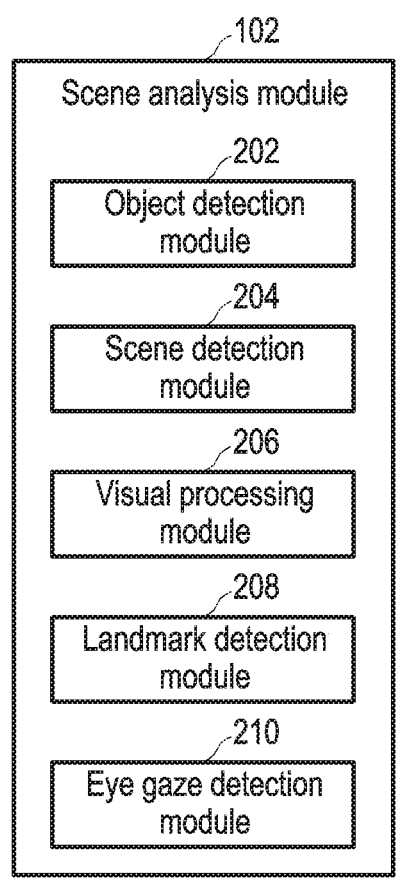
FIG. 2 illustrates a schematic block diagram of a scene analysis module according to an embodiment of the disclosure.

FIG. 2, a schematic block diagram of the scene analysis module (102) is illustrated according to an embodiment of the disclosure.

Referring to FIG. 2, the scene analysis module (102) includes an object detection module (202), a scene detection module (204), a visual processing module (206), a landmark detection module (208), and an eye gaze detection module (210).

In an example, the scene analysis module (102) may obtain an image displayed on the display (122). In one embodiment, the scene analysis module (102) may obtain an image displayed on the display (122) when a user is actively using the electronic device or selected content is being displayed at the electronic device. In another example, the scene analysis module (102) may obtain the image from an external image source (not illustrated in FIG. 1). The scene analysis module (102) identifies one or more objects in the image. Examples of the objects include, but are not limited to, physical objects, facial expressions of the users, geographical landmarks, and one or more predefined persons.

In an example, the scene analysis module (102) may use artificial intelligence (AI) techniques for object detection and scene determination. For instance, the scene analysis module (102) may use a person, landmark, facial expression, and/or one or more pattern recognition techniques such as You Only Look Once (YOLO), Single Shot Multi-Box Detector (SSD), Convolutional Neural Network (CNN), Region-based CNN (RCNN), Long Short-Term Memory (LSTM), etc. These AI techniques can be easily implemented on the aforementioned electronic devices such as smartphones or smart televisions. In an example, these AI techniques are implemented by the immersive display system (100) using a Neural Processing Unit (NPU).

The scene analysis module (102) may extract various parameters, such as, but not limited to, size, position, depth, etc. for the detected objects. The scene analysis module (102) may also extract contextual information about the detected objects. In an example, when a Graphics Interchange Format (GIF) file is displayed on the display (122), the scene analysis module (102) processes every frame of the GIF file.

The object detection module (202) detects the objects in the image. In an example, the object detection module (202) uses image processing and image recognition techniques to detect the objects in the image. In an example, the object detection module (202) uses machine learning and artificial intelligence techniques to detect the objects in the image. In another example, the object detection module (202) is trained to detect the objects using machine learning techniques during initialization of the immersive display system (100).

The scene detection module (204) detects a scene or environment associated with the image. For instance, the scene detection module (204) determines whether the image relates to an indoor scene or an outdoor scene. In an example, the scene detection module (204) uses image processing and image recognition techniques to detect the scene.

The visual processing module (206) determines one or more visual characteristics of the identified objects. Examples of the visual characteristics include, but are not limited to, an area occupied by the identified objects in the image, luminance, chrominance, appearance of the identified objects, depth of the object, or perspective of the image.

The landmark detection module (208) detects presence of one or more renowned or well-known monuments or landmarks in the image. In an example, the landmark detection module (208) uses image processing and image recognition techniques to detect the monuments or landmarks in the image.

The eye gaze detection module (210) detects the eye gaze of the users. For instance, the eye gaze detection module (210) detects whether the user is looking at the display (122) or not. The eye gaze detection module (210) may also detect a direction or an object at which the user is looking. In an example, the eye gaze detection module (210) uses information captured by a camera to determine the eye gaze of the users.

Figure 3:
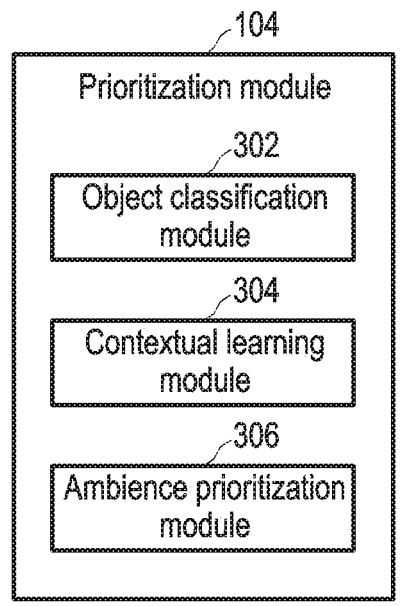
FIG. 3 illustrates a schematic block diagram of a prioritization module according to an embodiment of the disclosure.

FIG. 3, a schematic block diagram of the prioritization module (104) is illustrated according to an embodiment of the disclosure.

Referring to FIG. 3, the prioritization module (104) includes an object classification module (302), a contextual learning module (304), and an ambience prioritization module (306).

The prioritization module (104) receives information about the identified objects and the visual characteristics of the identified objects from the scene analysis module (102).

The prioritization module (104) assigns a priority value to each identified object based on the corresponding visual characteristics of the object.

The object classification module (302) receives the information about the identified objects and the visual characteristics corresponding to the identified objects from the scene analysis module (102). The object classification module (302) classifies the identified objects into audible objects and non-audible objects based on the corresponding visual characteristics. Here, the audible objects are the objects identified in the image that are capable of emitting sound whereas the non-audible objects are the objects identified in the image that are not capable of emitting sound. The object classification module (302) provides the information about the audible objects and the corresponding visual characteristics of the audible objects to the contextual learning module (304).

The contextual learning module (304) assigns priority values to the audible objects based on the corresponding visual characteristics. In an example, the audible objects that are likely to be perceived to dominate the audio file generated for the image are assigned a higher priority than the audible objects that are less likely to be influence in the resulting audio file. In another example, the audible objects that appear closer in the image are assigned a higher priority than the audible objects that appear farther in the image. In yet another example, the audible objects having a greater intensity of sound, i.e., louder objects are assigned a higher priority than the audible objects having a lower intensity of sound, i.e., quieter objects. In an example, the priority values of the audible objects are assigned according to percentage values. In another example, the priority values of the audible objects are assigned in terms of relative numerical values. In yet another example, the priority values of the audible objects are assigned in terms of absolute numerical values.

The ambience prioritization module (306) assigns priority values to the audible objects based on ambience information. In an example, the audible objects that are relevant to the ambience information are assigned a higher priority value than the audible objects that are not relevant to the ambience information. For instance, when the ambience information indicates snowfall, relevant objects such as snowflakes may be assigned a higher priority value. The ambience prioritization module (306) may also assign priority values to the audible objects based on the identified scene. In an example, the audible objects that are relevant to the identified scene are assigned a higher priority value than the audible objects that are not relevant to the identified scene. For instance, when the identified scene indicates an indoor celebration event, relevant objects such as festoons or banners may be assigned a higher priority value.

Figure 4:
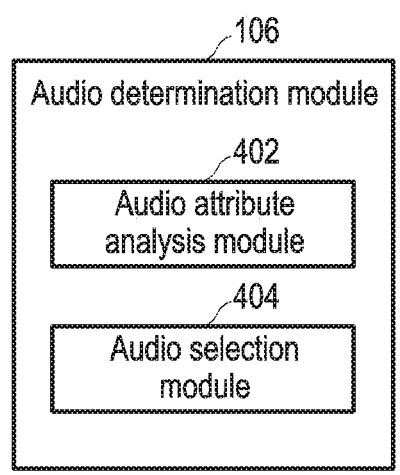
FIG. 4 illustrates a schematic block diagram of an audio determination module according to an embodiment of the disclosure.

FIG. 4, a schematic block diagram of the audio determination module (106) is illustrated according to an embodiment of the disclosure.

Referring to FIG. 4, the audio determination module (106) includes an audio attribute analysis module (402) and an audio selection module (404).

Figure 5:
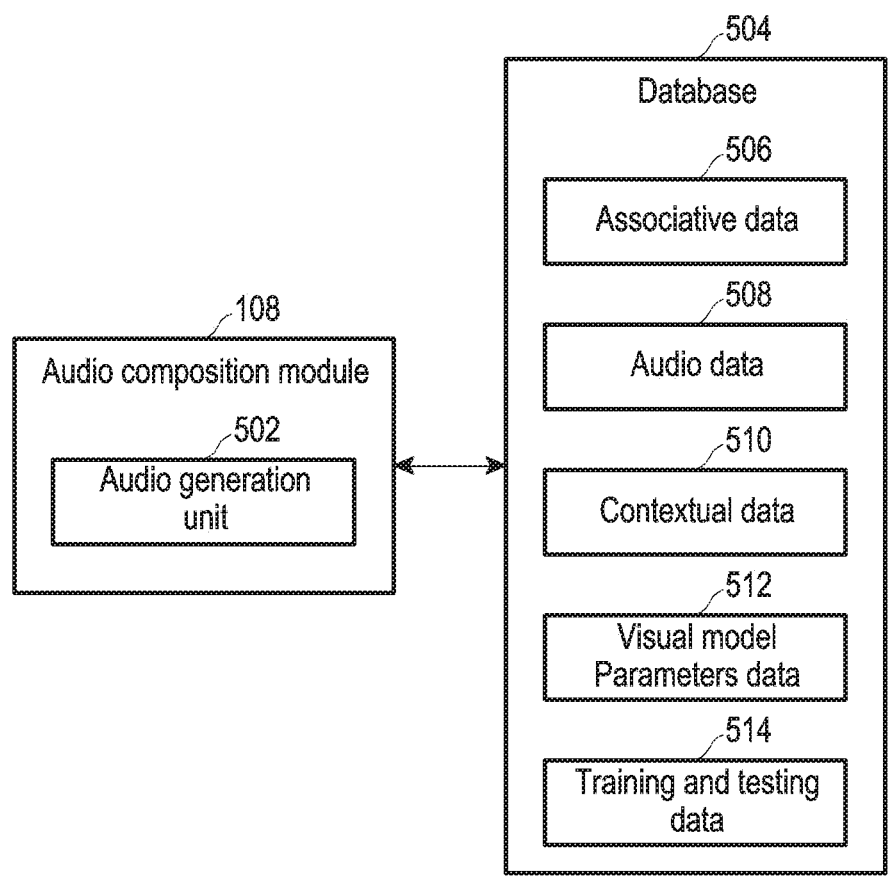
FIG. 5 illustrates a schematic block diagram of an audio composition module and a database in according to an embodiment of the disclosure.

FIG. 5, a schematic block diagram of the audio composition module and a database is illustrated according to an embodiment of the disclosure.

Referring to FIG. 5, the audio composition module (108) is in communication with database (504). While not illustrated in FIG. 5, the audio determination module 106 may also be in communication with the database (504). The audio composition module (108) includes an audio generation unit (502). The database (504) includes associative data (506), audio data (508), contextual data (510), visual model parameters data (512), and training and testing data (514).

The audio data (508) is a repository of audio files.

The associative data (506) includes information about the audio files and information associated with the possible audible objects associated with the audio files.

The contextual data (510) includes information about a context of the stored audio files.

The visual model parameters data (512) includes information about the possible visual characteristics associated with the audio files.

The training and testing data (514) include training algorithms and testing algorithms.

The audio determination module (106) receives the information about the audible objects and the corresponding priority values. The audio determination module (106) compares the priority values of the audible objects with a predefined confidence score. If the priority value of the audible object is greater than the predefined confidence score, the audio determination module (106) retrieves the audio files corresponding to the audible object from the database (504). If the priority value of the audible object is not greater than the predefined confidence score, the audio determination module (106) discards the audible object and checks for next audible object. The audio selection module (404) retrieves the audio files corresponding to the audible objects for which the priority values are greater than or equal to the confidence score. The attribute analysis module (402) determines one or more audio characteristics for the retrieved audio files. Examples of the audio characteristics include, but are not limited to, gain, amplitude, sampling frequency, scale factor, sound interval, genre, and pitch. The audio determination module (106) stores the audio characteristics for the retrieved audio files in the database (504).

In an example, the audio determination module (106) also assigns audio weights to the retrieved audio files. In an example, the audio weights determine a proportion of which the audio files are mixed to form dynamic composite audio data. In an example, the audio determination module (106) uses AI techniques such as Short-Term Fourier Transform (STFT) to identify a genre associated with the audio files stored in the database (504) and extract metadata from the audio files.

The audio determination module (106) provides the audio files and the audio weights to the audio composition module (108). The audio composition module (108) mixes the audio files to generate the dynamic composite audio data. The audio generation unit (502) generates the dynamic composite audio data from the audio files based on the audio characteristics of the audio files and the priority values of the corresponding audible objects. The audio generation unit (502) provides the generated dynamic composite audio to the speaker (120).

The audio composition module (108) uses an audio mixer to combine multiple audios files into a single combined audio file. The audio composition module (108) may adjust audio parameters such as gain, scaling factor, sampling frequency, attenuation, etc. to make the combined audio soothing or pleasing to hear. In an example, the audio composition module (108) uses Wavenet or generative adversarial network (GAN) techniques to produce the dynamic composite audio data. In another example, audio composition module (108) is trained using machine learning algorithms to generate raw music based on input audio and the audio parameters. In an exemplary embodiment, the dynamic composite audio data includes the raw music generated by the audio composition module (108).

The speaker (120) is configured to play the dynamic composite audio data while the image is displayed on the display (122), thereby providing an immersive experience to the users of the electronic devices.

Advantageously, time required to generate the dynamic composite audio data is less than image transition time. This provides a seamless and uninterrupted immersive experience to the users. Since the time required to generate the dynamic composite audio data is less than image transition time, there is no delay or lag between display of two consecutive images along with the corresponding dynamic composite audio files. Hence, the user may perceive that the image and the dynamic composite audio are played at the same time instantaneously.

Figure 6:
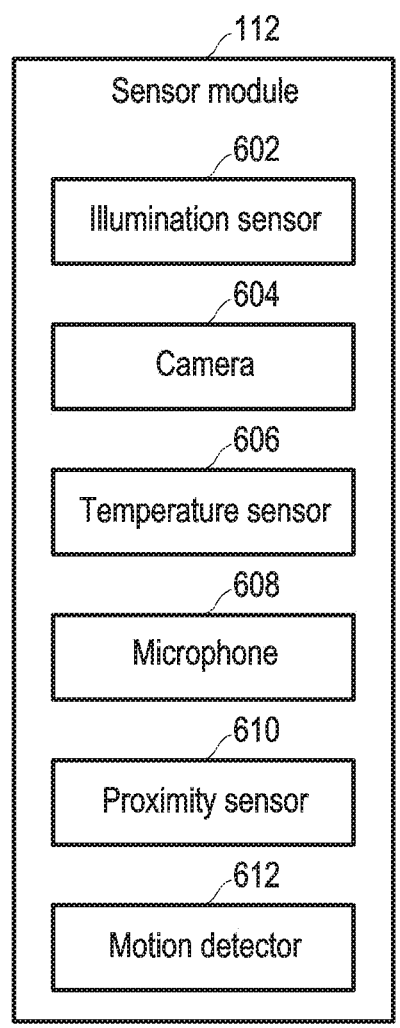
FIG. 6 illustrates a schematic block diagram of a sensor module according to an embodiment of the disclosure.

FIG. 6 illustrates a schematic block diagram of the sensor module according to an embodiment of the disclosure.

Referring to FIG. 6, the sensor module (112) includes an illumination sensor (602), a camera (604), a temperature sensor (606), a microphone (608), a proximity sensor (610), and a motion detector (612).

The illumination sensor (602) detects a level or an amount of illumination surrounding the electronic device. For instance, the illumination sensor (602) detects whether a room in which a smart television is located is dimly lit or well lit. Or for instance, the illumination sensor (602) determines whether the room is lit by natural light or by artificial light.

The camera (604) captures a video or an image of the surroundings of the electronic device. In an example, the camera feed or the camera input may be used to determine whether the room is occupied or not. The camera (604) may also be used to capture facial expressions or eye gaze. The camera feed may also be used to determine the scene in the room. The camera feed may also be used to determine visible weather conditions, such as, rainfall, snowfall, dust storm, etc. All the aforesaid information obtained from camera feed is included in the ambience information determined by the ambience analysis module (114).

The temperature sensor (606) may be used to detect a temperature in vicinity of the electronic device.

The microphone (608) may be used to capture words or sentences spoken by a user in the vicinity of the electronic device. The audio captured by the microphone (608) may be used to identify moods of the user. The microphone (608) may also capture a song being played in the vicinity of the electronic device.

The proximity sensor (610) may be used to determine the presence of a user in the vicinity of the electronic devices.

The motion detector (612) may be used to detect occupancy within the room, i.e., whether the room is occupied or not and also a number of people occupying the room.

The feed from the illumination sensor (602), the camera (604), the temperature sensor (606), the microphone (608), the proximity sensor (610), and the motion detector (612) is provided to the ambience analysis module (114) as sensor inputs.

The ambience analysis module (114) generates the ambience information based on the sensor inputs. Examples of the ambience information include, but are not limited to, ambient lighting, persons in the vicinity of the electronic devices, objects in vicinity the of the display, and the weather, events, actions of the users, time, time of day, location, a predetermined schedule, and contextual information associated to surroundings of the electronic device.

In an example, the ambience analysis module (114) generates the ambience information indicative of light intensity within the room. For instance, a bright light within the room may be associated with a cheerful mood and a dim light may be associated with a gloomy mood. In another instance, the ambience analysis module (114) may also detect festivals, time of day, weather, etc.

The immersive display system (100) provides the dynamic composite audio data based on the ambience information. For example, the prioritization module (104) assigns the priority value to each audible object based on the corresponding visual characteristics and the ambience information. The audio composition module (108) generates the dynamic composite audio data based on the audio characteristics of the audio files, the priority values of the audible objects, and the ambience information.

For instance, the prioritization module (104) may assign the priority values based on the visual characteristics such as size, position, focus, relative depth, etc. and on the ambience information such as light intensity, events, weather, etc. In an example, the prioritization module (104) uses contextual AI techniques to assign the priority values to the objects. The prioritization module (104) may determine a type of audio associated with the audible objects, for instance, a continuous audio may be associated with ocean waves whereas an intermittent or periodic audio may be associated with birds detected in the image. The contextual AI may determine the audio weights to the objects based on foreground and background of the image, context of the image, the user's history, etc.

The feedback module (110) receives feedback from the user and provides the feedback to the prioritization module (104). The contextual learning module (304) receives the feedback from the feedback module (110), calculates an updated priority value for each audible object based on the corresponding visual characteristics and the received feedback. Examples of the feedback include, but are not limited to, attention time of the user, eye gaze of the user, change in volume level of the dynamic composite audio, one or more facial expressions of the user, and an active feedback provided by the user. Further, in an example, the contextual AI may also analyze the user's interest when the dynamic composite audio is played along with the image.

Figure 7:
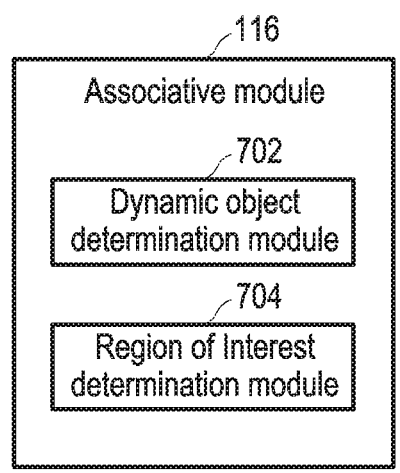
FIG. 7 illustrates a schematic block diagram of an associative module according to an embodiment of the disclosure.

FIG. 7, a schematic block diagram of the associative module (116) is illustrated according to an embodiment of the disclosure.

Referring to FIG. 7, the associative module (116) includes a dynamic object determination module (702) and a region of interest determination module (704).

The region of interest determination module (704) identifies one or more regions of interest. The regions of interest are one or more parts of the image that have the identified objects. The associative module (116) determines one or more key objects out of the identified objects. The key objects are the objects capable of moving in a path in an external environment. The dynamic object determination module (702) retrieves one or more external dynamic objects corresponding to the key objects from an external database (not shown). The associative module (116) provides the information about the external dynamic objects to the generative module (118).

Figure 8:
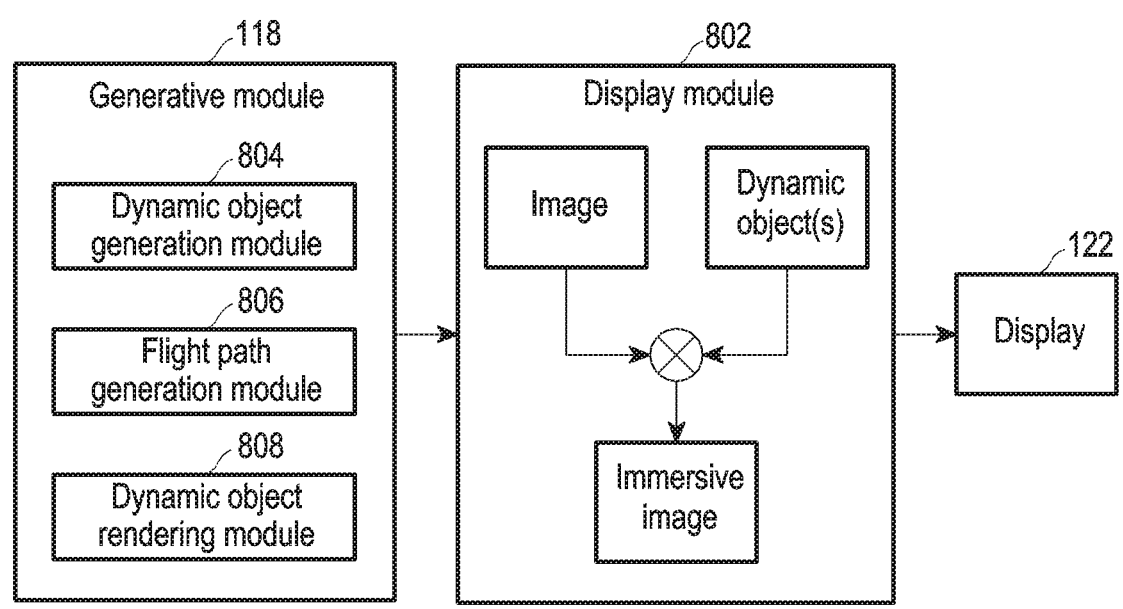
FIG. 8 illustrates a schematic block diagram of a generative module and a display module according to an embodiment of the disclosure.

FIG. 8 illustrates a schematic block diagram of the generative module and a display module according to an embodiment of the disclosure.

Referring to FIG. 8, the generative module (118) is in communication with the display module (802). The generative module (118) includes a dynamic object generation module (804), a flight path generation module (806), and a dynamic object rendering module (808). The display module (802) controls the display (122).

The dynamic object generation module (804) generates one or more dynamic objects. The flight path generation module (806) generates one or more flight paths for the external dynamic objects such that the external dynamic object appears to move along a corresponding flight path. The flight paths are one or more trails or trajectories within the regions of interest in the image along which the external dynamic objects are rendered.

The dynamic object rendering module (808) renders the external dynamic objects on the corresponding flight paths within the corresponding regions of interest on the image.

In an example, the generative module (118) also determines a type of animation for the external dynamic objects. Examples of the animation include, but are not limited to, fading in, fading out, etc. For example, the dynamic object rendering module (808) renders the dynamic objects as per the determined animation style.

The display module (802) mixes the image and the external dynamic objects to display an immersive image having the image and the external dynamic objects animated therein. The immersive image is displayed on the display (122).

FIGS. 9A to 9E illustrate a schematic representation of the immersive display method according to various embodiments of the disclosure.

Figure 9A:
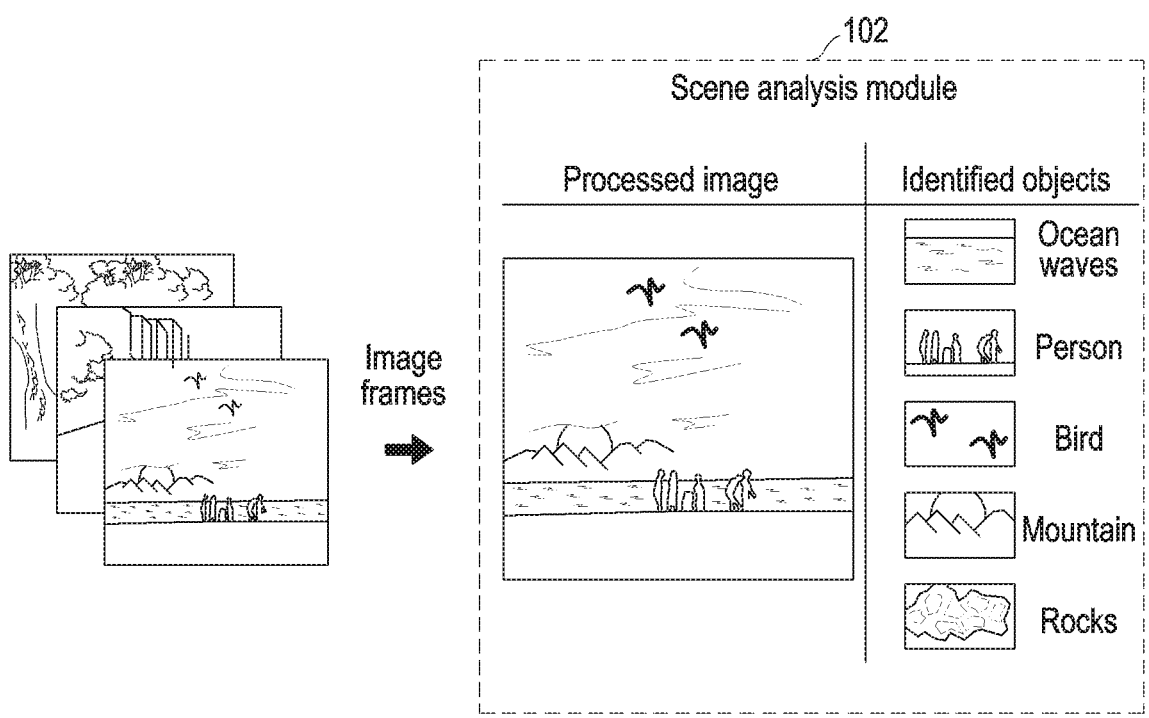
FIGS. 9A, 9B, 9C, 9D, and 9E illustrate a schematic representation of an immersive display method according to various embodiments of disclosure.

Referring to FIG. 9A, the scene analysis module (102) receives a plurality of image frames. The scene analysis module (102) identifies objects such as ocean waves, a person, a bird, a mountain, and rocks within the image.

Figure 9B:
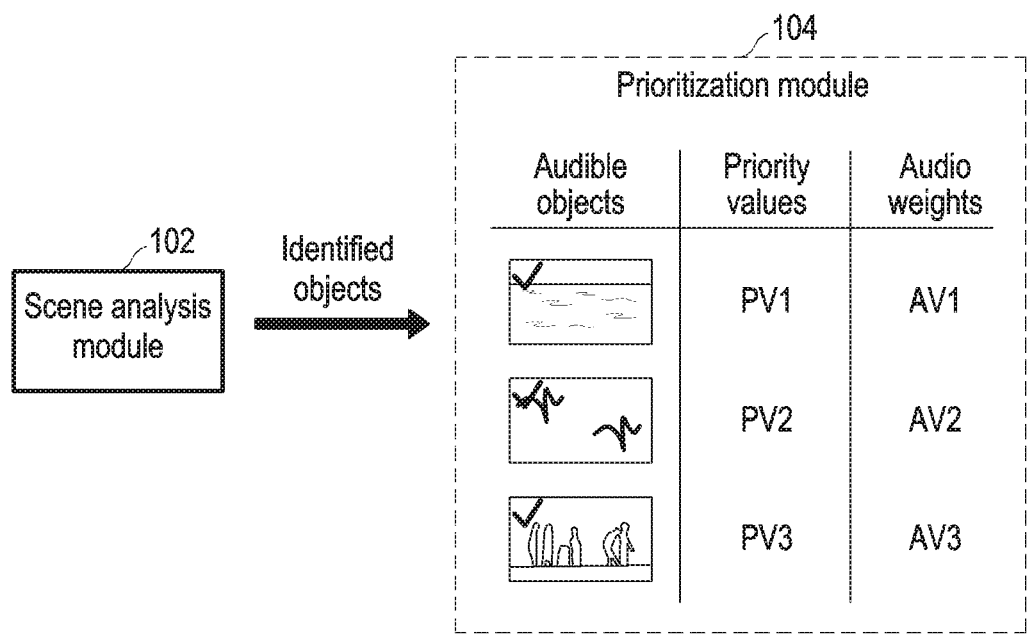

Referring to FIG. 9B, the scene analysis module (102) provides the identified objects to the prioritization module (104). The prioritization module (104) classifies the objects into audible objects and non-audible objects based on whether the identified object is capable of generating a sound. For example, the prioritization module (104) classifies the ocean waves, the bird, and the person as the audible objects and the mountain and the rocks as the non-audible objects.

The prioritization module (104) assigns priority values PV1, PV2, and PV3 to the ocean waves, the bird, and the person, respectively. The corresponding audio weights of the objects are AV1, AV2, and AV3 respectively.

Figure 9C:
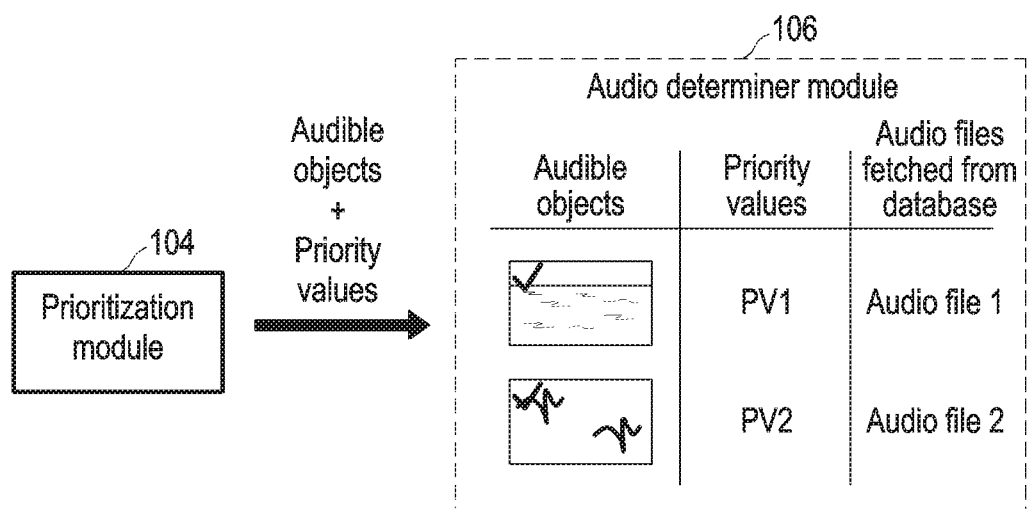

Referring to FIG. 9C, after the prioritization module (104) provides the audible objects and the corresponding priority values to the audio determination module (106), the audio determination module (106) compares the priority values of the objects with the threshold confidence score. For example, the ocean waves and the bird have the corresponding priority values greater (PV1 and PV2) than or equal to the threshold confidence score and the person has the priority value (PV3) less than the threshold confidence score. Therefore, the audio determination module (106) retrieves the first and second audio files corresponding to the ocean waves and the birds respectively.

Figure 9D:
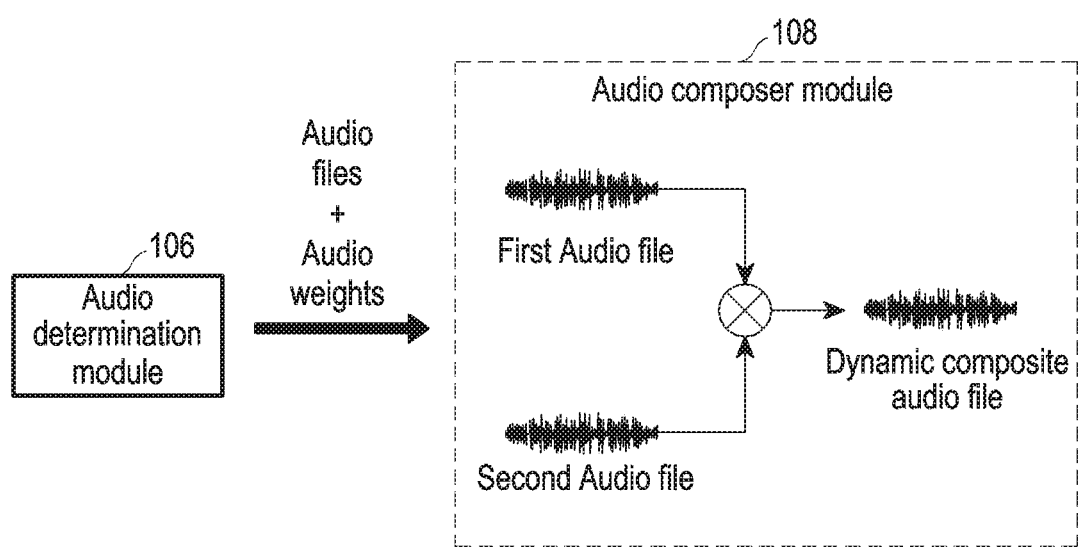

Referring to FIG. 9D, after the audio determination module (106) provides the first and second audio files and the corresponding audio weights to the audio composition module (108), the audio composition module (106) mixes the first and second audio files to generate the dynamic composite audio file based on the corresponding audio weights and the priority values of the objects.

Figure 9E:
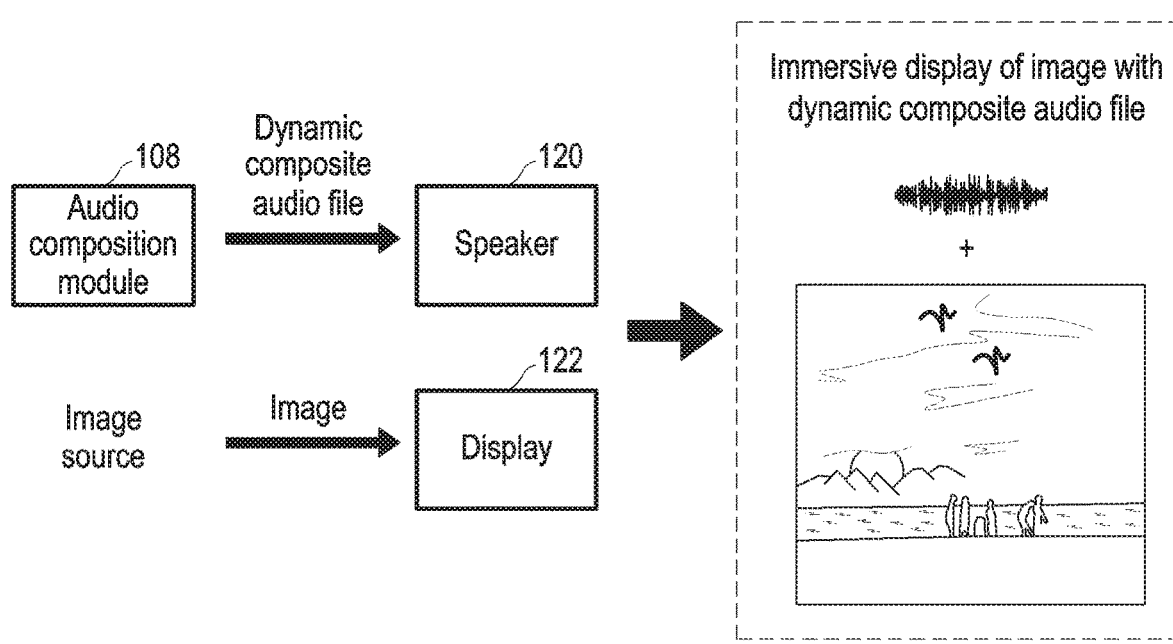

Referring to FIG. 9E, the audio composition module (108) provides the dynamic composite audio file to the speaker (120). The speaker (120) plays the dynamic composite audio file and the display (122) displays the image such that the dynamic composite audio file and the image are presented simultaneously, thereby providing an immersive and pleasing experience to the users.

Figure 10A:
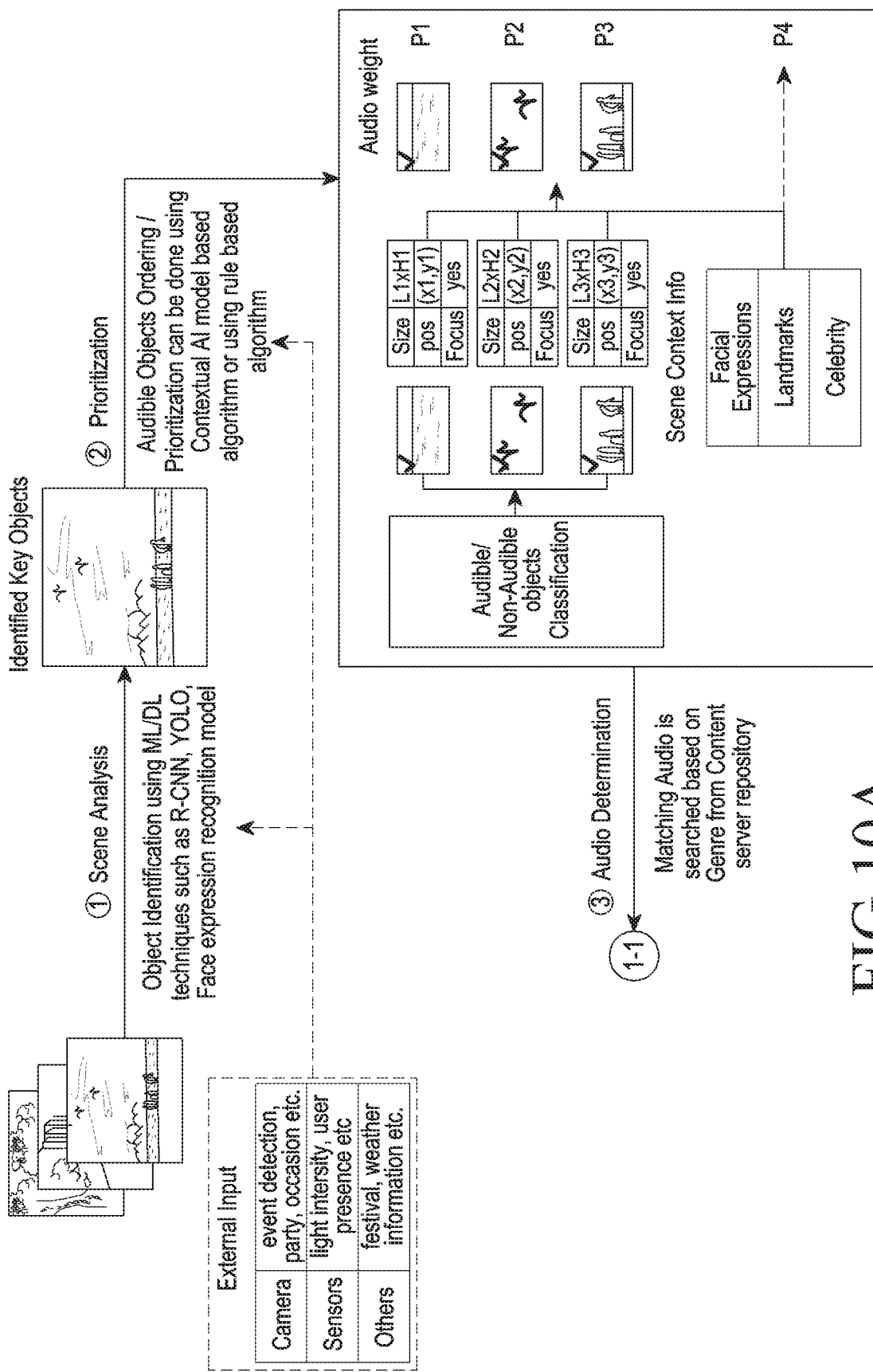
FIGS. 10A and 10B illustrate a schematic representation of an immersive display method according to an embodiment of the disclosure.
Figure 10B:
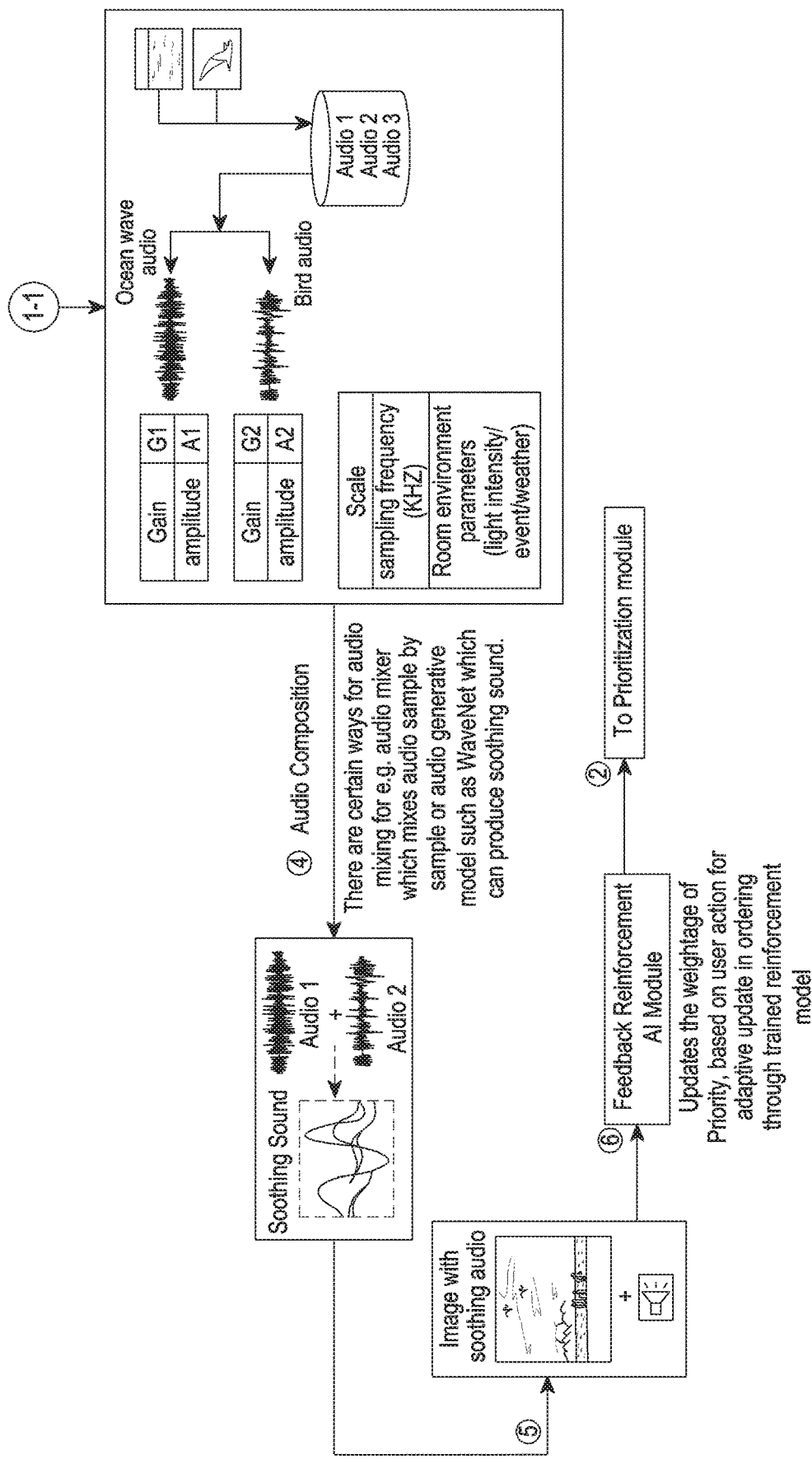

FIGS. 10A and 10B illustrates a schematic representation of the immersive display method according to an embodiment of the disclosure.

Referring to FIG. 10A, at 1, the scene analysis module (102) identifies objects within the image. For example, object identification may be performed using machine learning (ML) or distributed deep learning (DL) techniques such as R-CNN, YOLO, face expression recognition model, etc.

At 2, the prioritization module (104) classifies the objects into audible and non-audible objects. The prioritization module (104) assigns the priority values to the audible objects. For example, the classification of the objects may be performed using contextual AI model based on an algorithm or using a rule based algorithm.

At 3, the audio determination module (106) retrieves the audio files for the objects having the priority values greater than or equal to the threshold confidence scores. In an exemplary embodiment, audio files stored on a content server repository and the audio files may be searched based on a category or genre associated with the objects.

Referring to FIG. 10B, at 4, the audio composition module (108) generates the dynamic composite audio data. For example, audio mixing may be used to mix audio samples to produce a resulting audio file.

At 5, the display (122) displays the image and the speaker (120) plays the dynamic composite audio data simultaneously.

At 6, the feedback module (110) provides the feedback to the prioritization module (104).

Figure 11A:
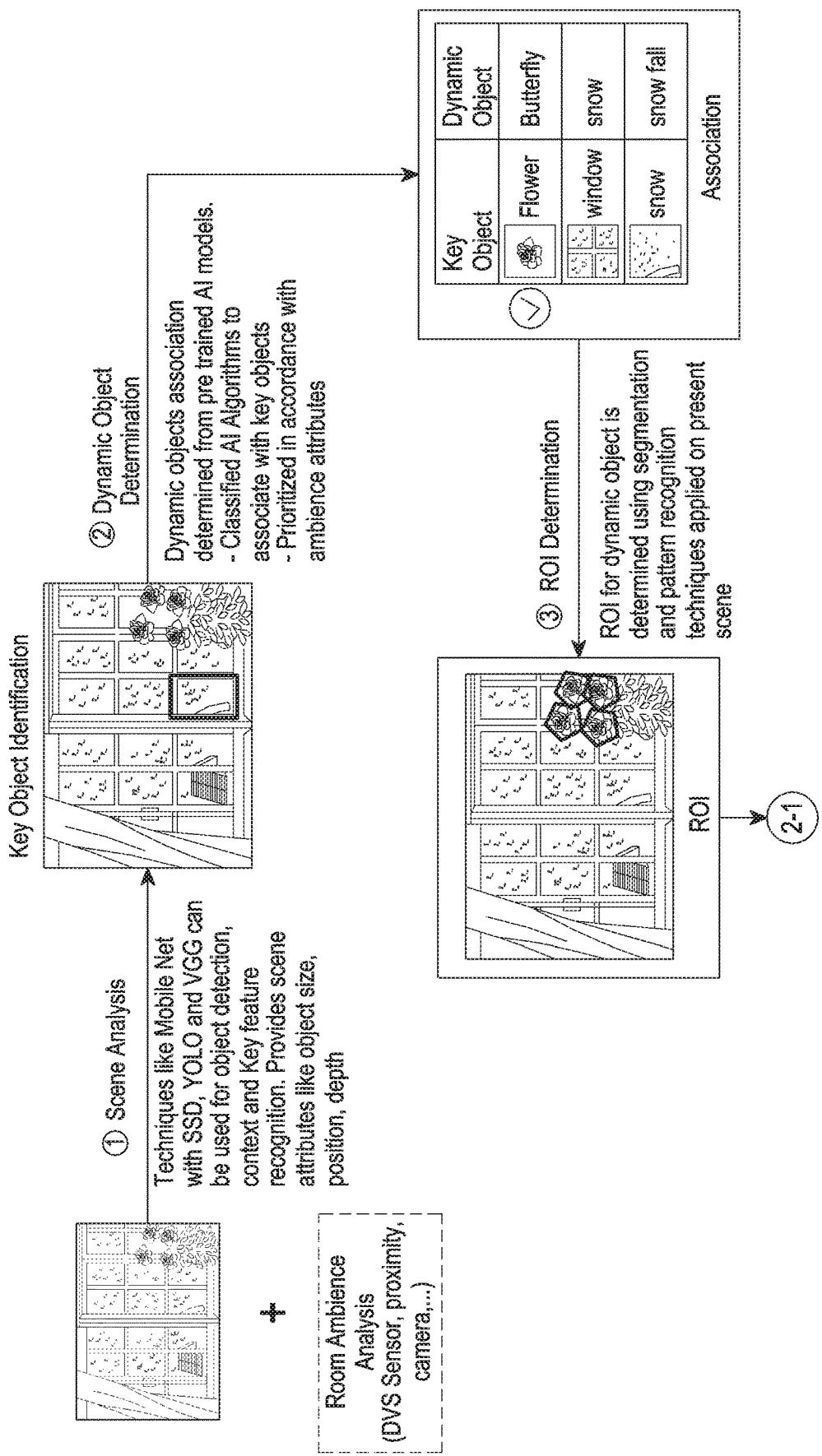
FIGS. 11A and 11B illustrate a schematic representation of an immersive display method according to an embodiment of the disclosure.
Figure 11B:
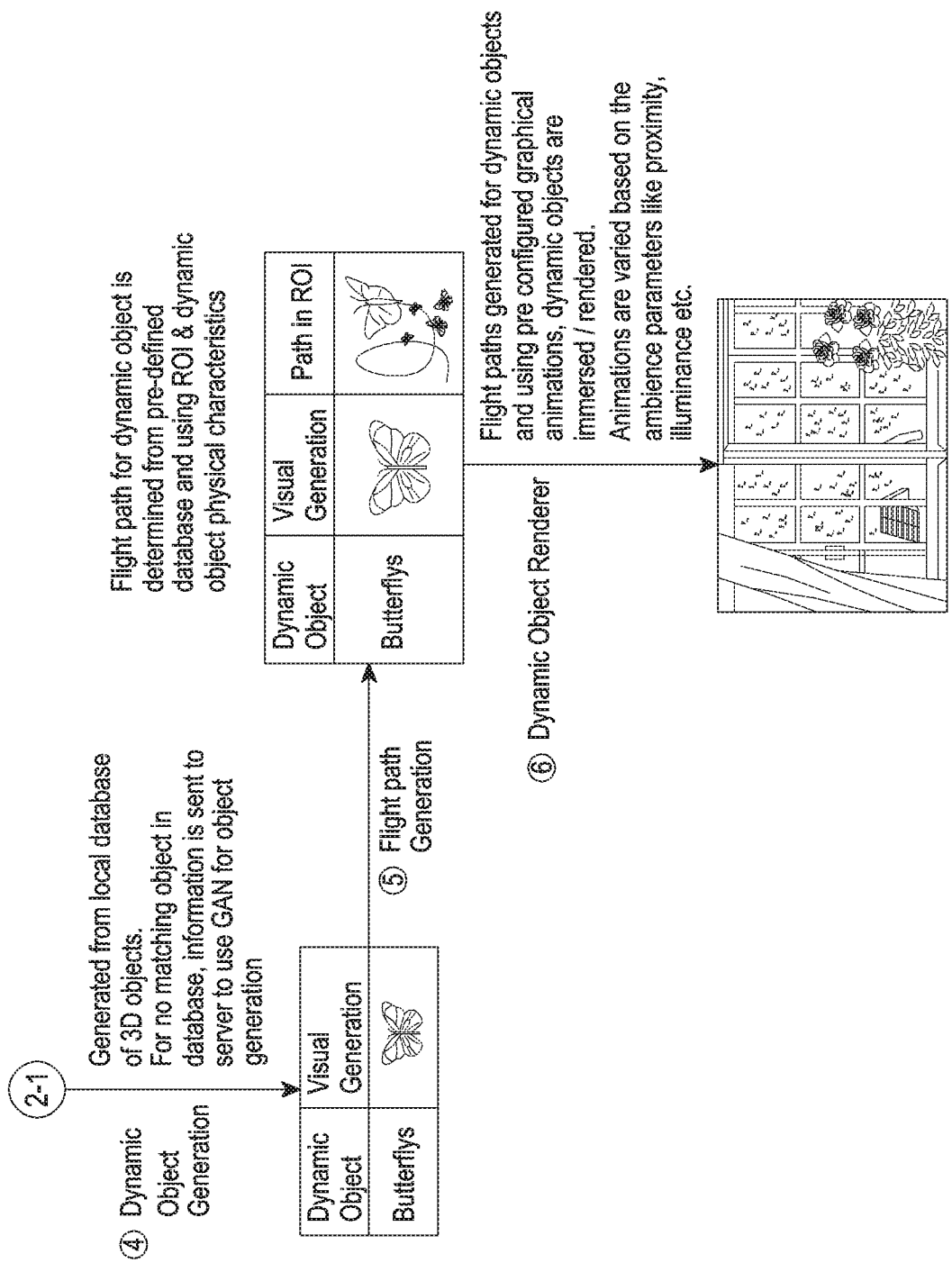

FIGS. 11A and 11B illustrate a schematic representation of the immersive display method according to an embodiment of the disclosure.

Referring to FIG. 11A, at 1, the scene analysis module (102) identifies the scene based on the image.

At 2, the dynamic object determination module (702) retrieves the external dynamic objects from the database.

At 3, the region of interest determination module (704) determines the region of interest within the image.

Referring to FIG. 11B, at 4, the dynamic object generation module (804) generates the dynamic objects.

At 5, the flight path generation module (806) generates the flight paths for the external dynamic objects.

At 6, the dynamic object rendering module (808) renders the external dynamic objects along the corresponding flight paths within the corresponding regions of interest of the image on the display (122).

Figure 12:
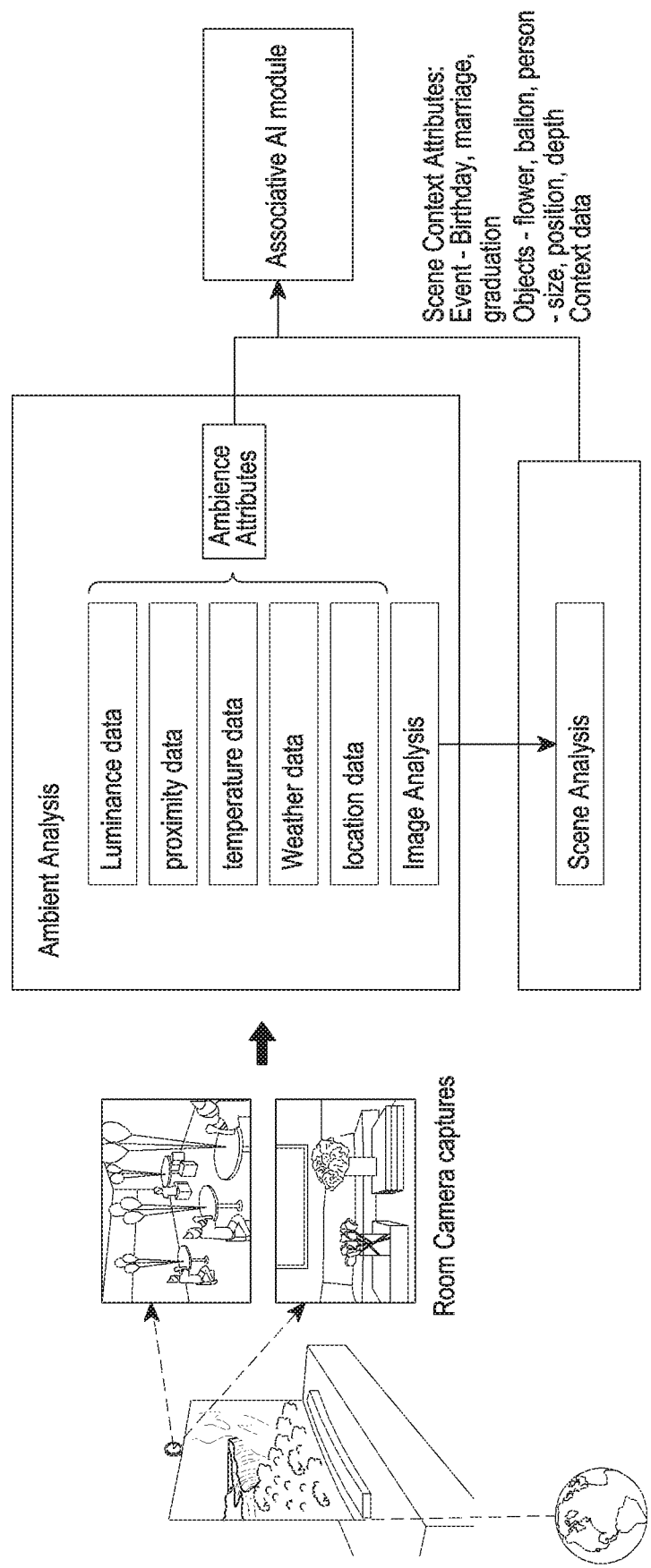
FIG. 12 illustrates a schematic representation of ambience analysis according to an embodiment of the disclosure.

FIG. 12 illustrates a schematic representation of ambience analysis according to an embodiment of the disclosure.

Referring to FIG. 12, the ambience analysis module (114) receives the sensor inputs such as luminance data, proximity data, temperature data, weather data, location data, and image analysis. The ambience analysis module (114) generates the ambience information based on the sensor inputs. The ambience analysis module (114) provides the ambience information to the scene analysis module (102) and the associative module (116).

Figure 13:
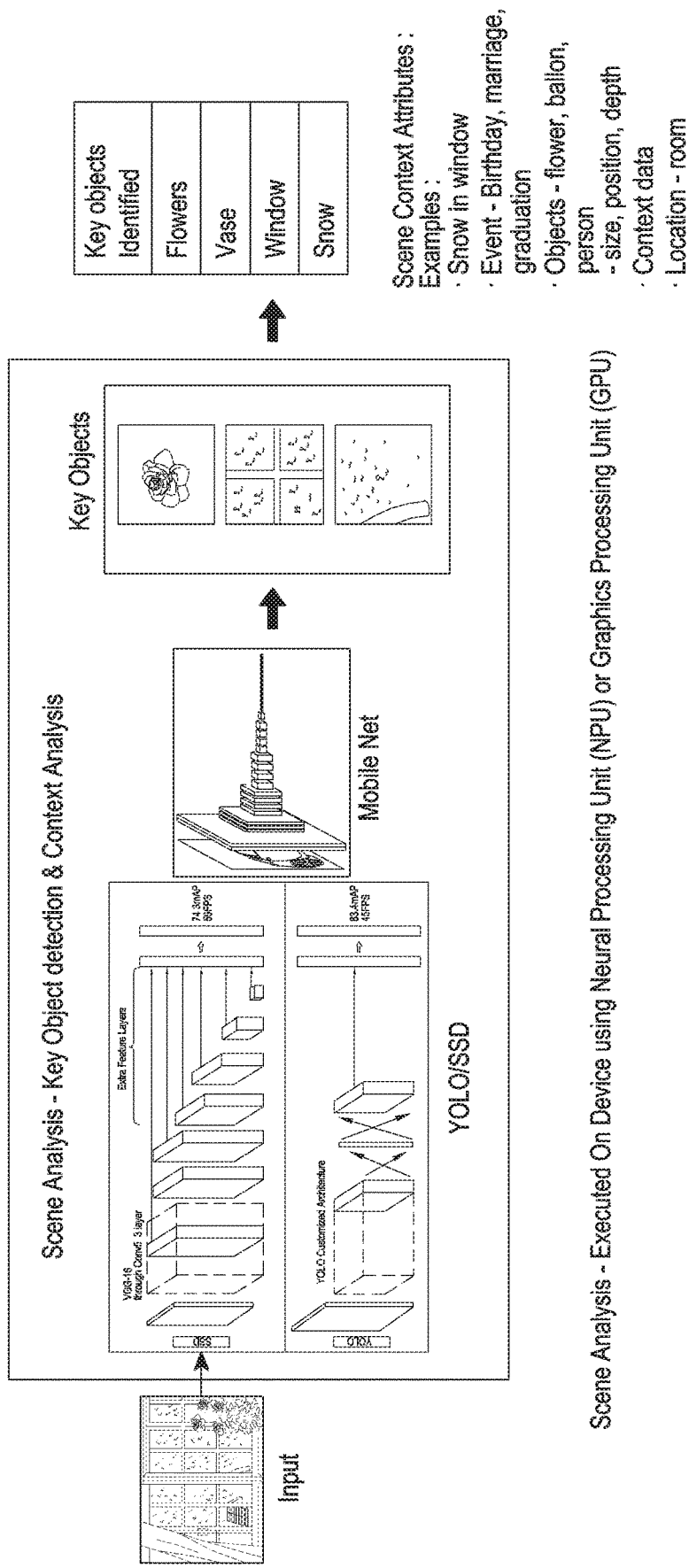
FIG. 13 illustrates a schematic representation of scene analysis according to an embodiment of the disclosure.

FIG. 13 illustrates a schematic representation of scene analysis according to an embodiment of the disclosure.

Referring to FIG. 13, the scene analysis module (102) identifies the scene based on the image. The scene analysis module (102) also identifies the key objects in the image.

Figure 14:
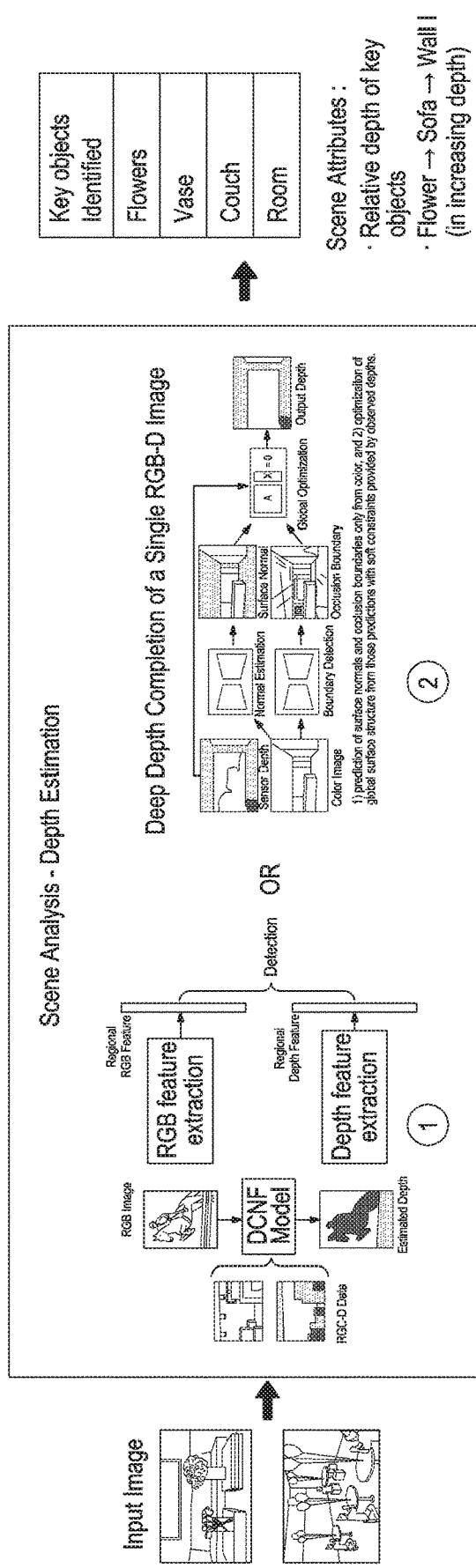
FIG. 14 illustrates a schematic representation of scene analysis according to an embodiment of the disclosure.

FIG. 14 illustrates a schematic representation of scene analysis according to an embodiment of the disclosure.

Referring to FIG. 14, the scene analysis module (102) identifies the scene based on the image. The scene analysis module (102) also identifies the key objects in the image.

Figure 15:
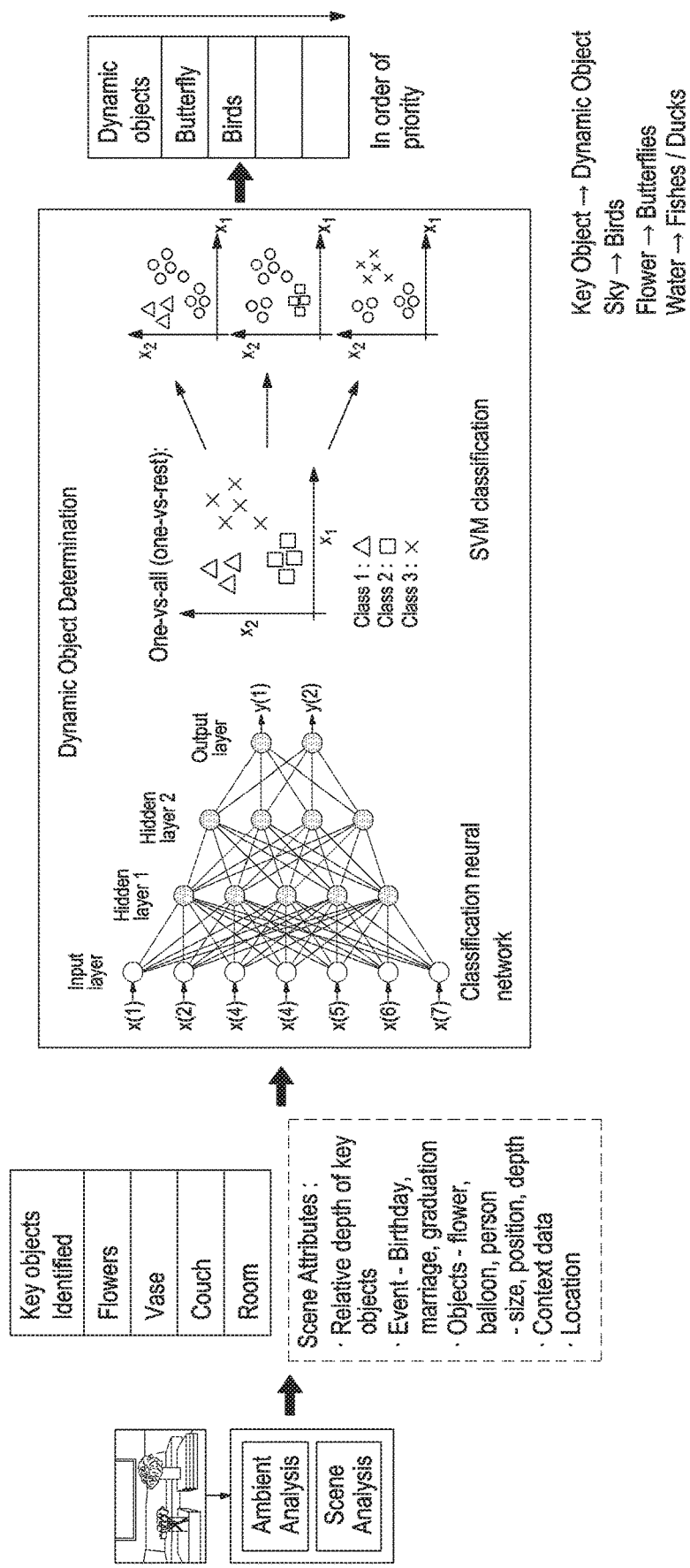
FIG. 15 illustrates a schematic representation of dynamic object determination according to an embodiment of the disclosure.

FIG. 15 illustrates a schematic representation of dynamic object determination according to an embodiment of the disclosure.

Referring to FIG. 15, the dynamic object determination module (702) determines the external dynamic objects corresponding to the key objects.

Figure 16:
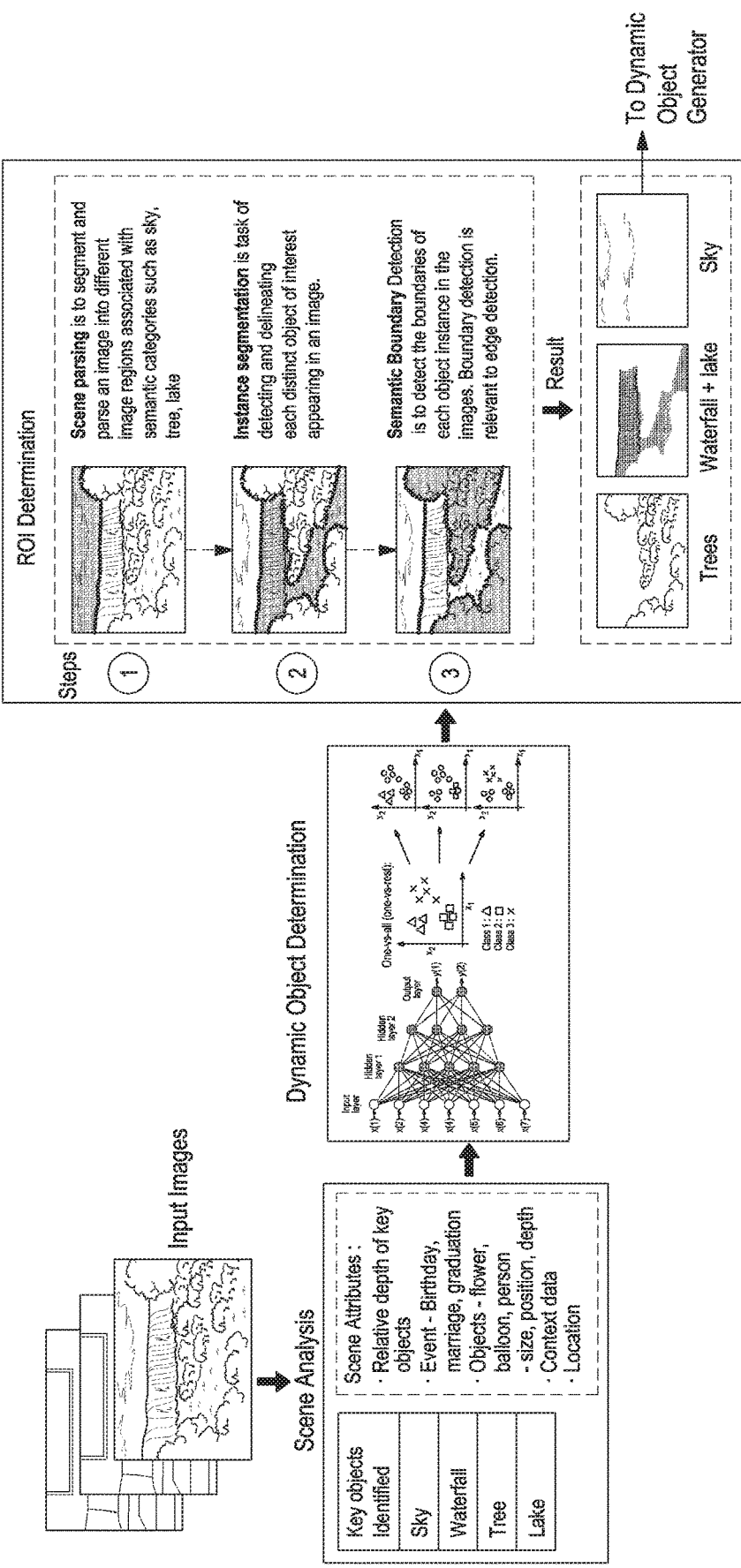
FIG. 16 illustrates a schematic representation of region of interest determination according to an embodiment of the disclosure.

FIG. 16 illustrates a schematic representation of region of interest determination according to an embodiment of the disclosure.

Referring to FIG. 16, the region of interest determination module (704) determines the regions of interest within the image.

Figure 17:
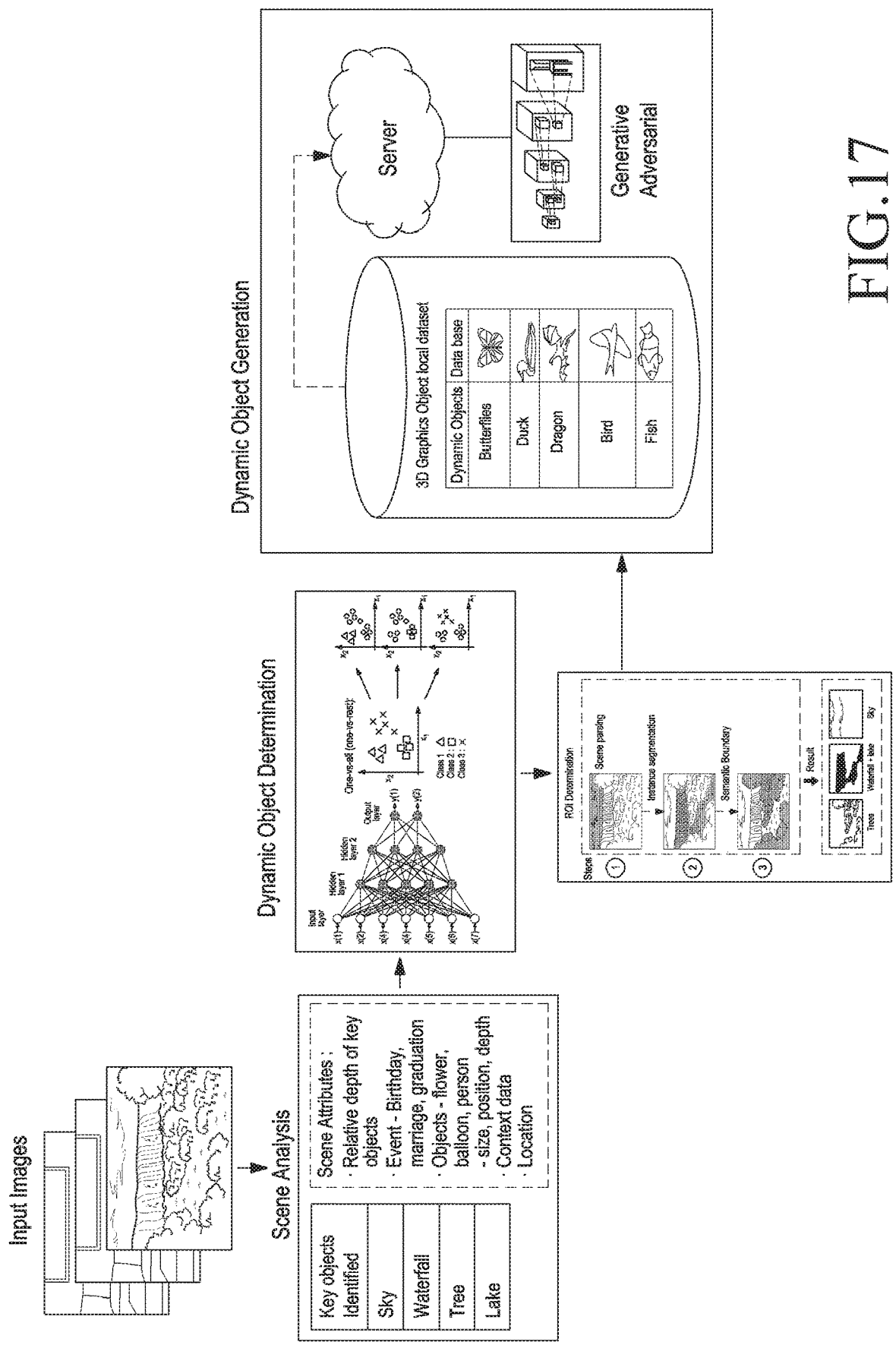
FIG. 17 illustrates a schematic representation of dynamic object generation according to an embodiment of the disclosure.

FIG. 17 illustrates a schematic representation of dynamic object generation according to an embodiment of the disclosure.

Referring to FIG. 17, the dynamic object generation module (804) generates the dynamic objects corresponding to the key objects.

Figure 18:
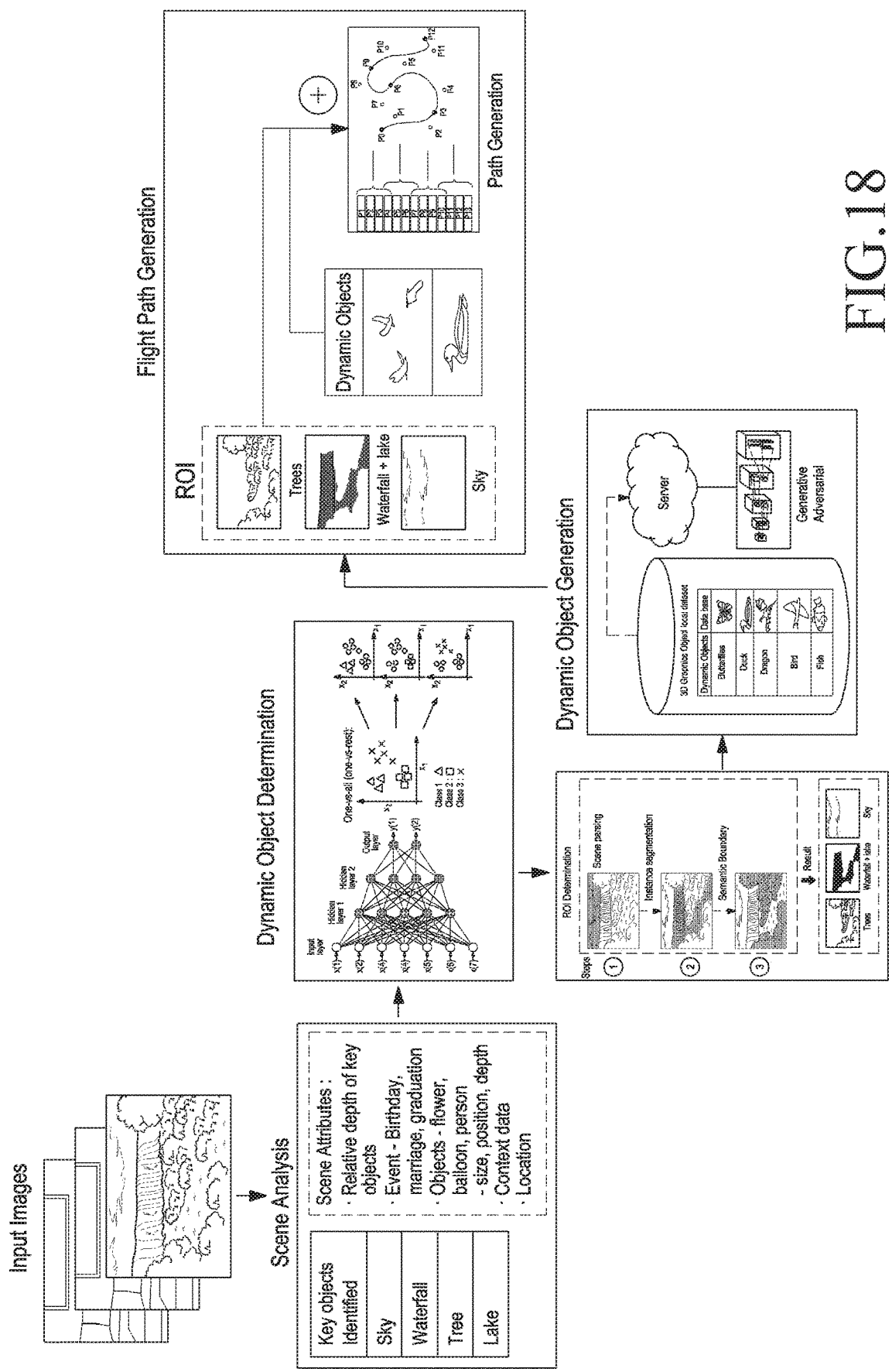
FIG. 18 illustrates a schematic representation of flight path generation according to an embodiment of the disclosure.

FIG. 18 is a schematic representation of flight path generation according to an embodiment of the disclosure.

Referring to FIG. 18, the flight path generation module (806) generates the flight path for the external dynamic objects.

Figure 19:
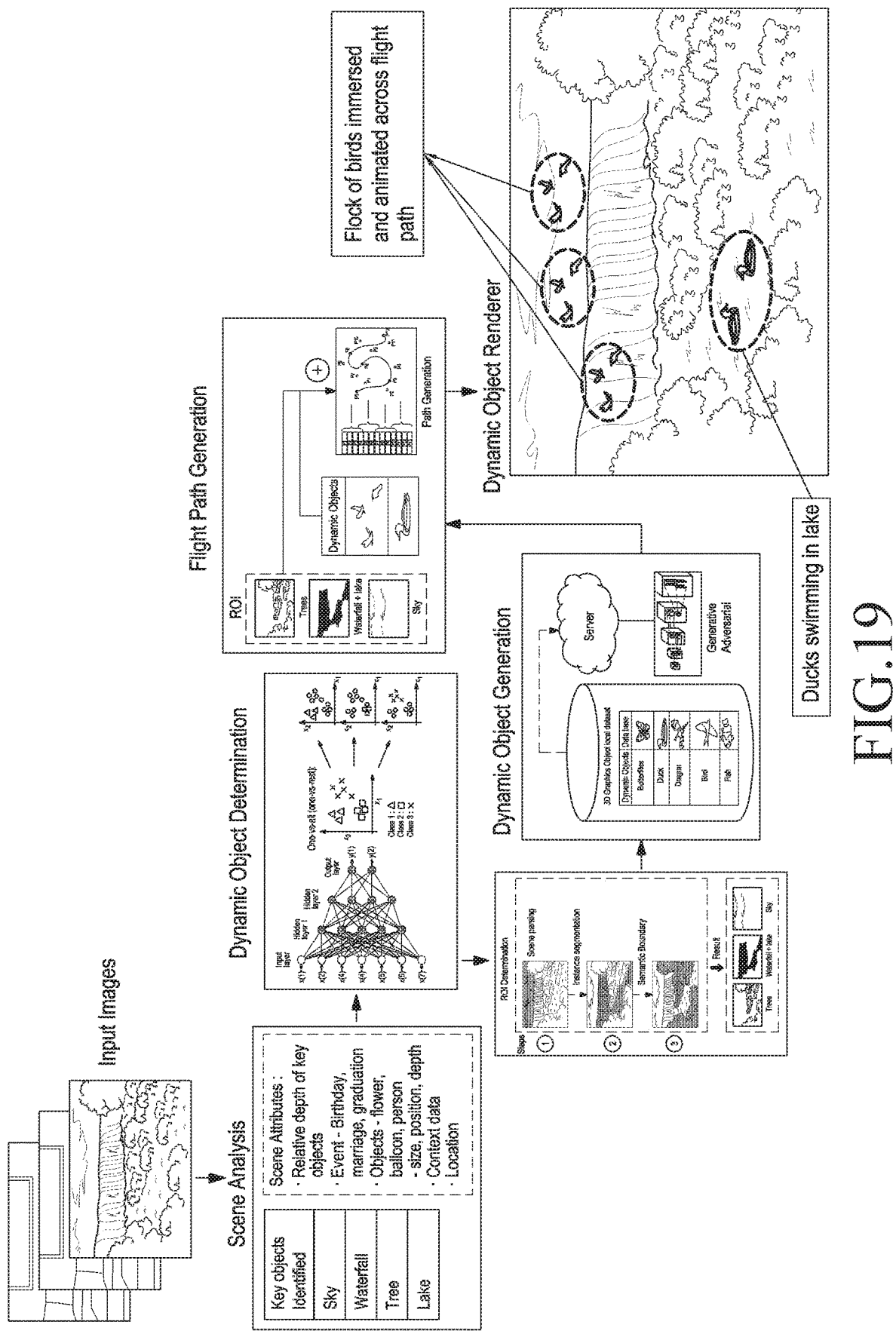
FIG. 19 illustrates a schematic representation of dynamic object rendering according to an embodiment of the disclosure.

FIG. 19 illustrates a schematic representation of dynamic object rendering according to an embodiment of the disclosure.

Referring to FIG. 19, the dynamic composite rendering module (808) renders the external dynamic objects along the corresponding flight paths within the corresponding regions of interest on the image.

Figure 20:
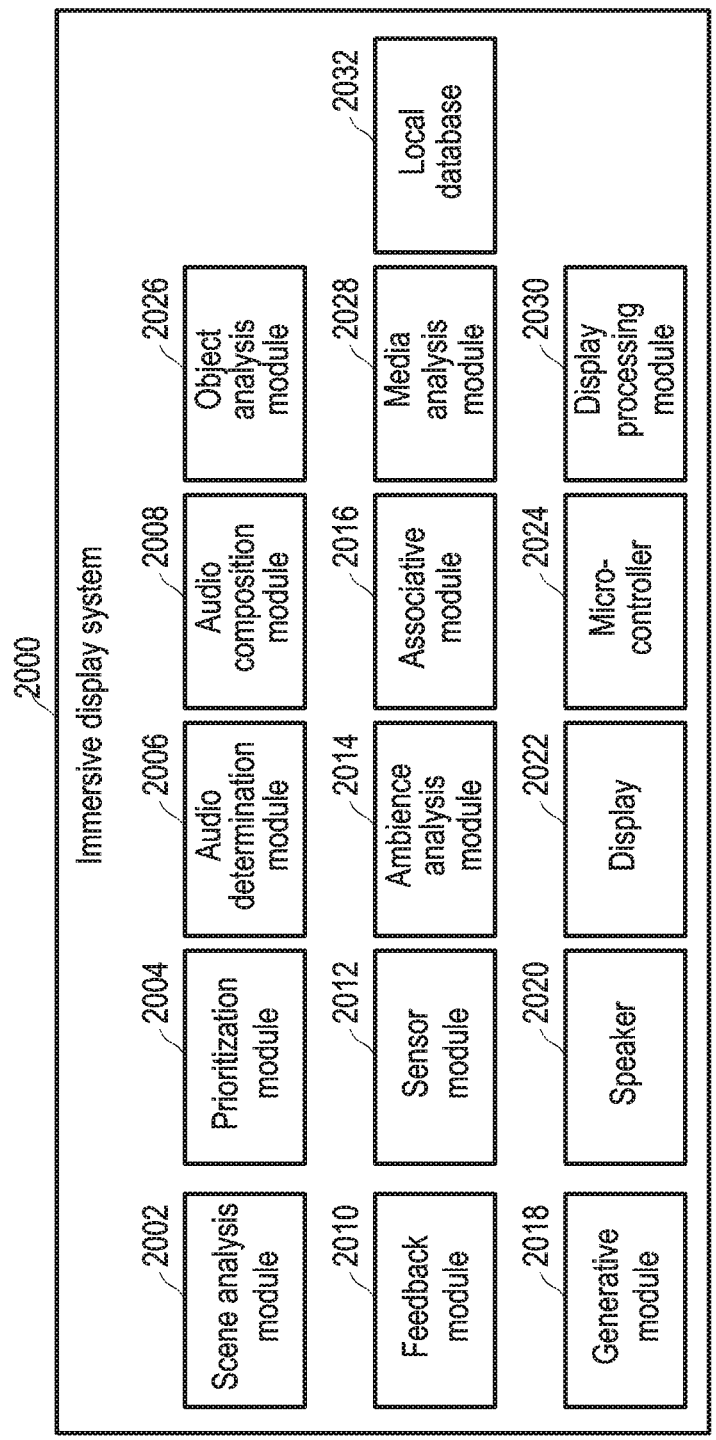
FIG. 20 illustrates a schematic block diagram of an immersive display system according to an embodiment of the disclosure.

FIG. 20 illustrates a schematic block diagram of an immersive display system (2000) according to an embodiment of the disclosure.

Referring to FIG. 20, the immersive display system (2000) includes a scene analysis module (2002), a prioritization module (2004), an audio determination module (2006), an audio composition module (2008), a feedback module (2010), a sensor module (2012), an ambience analysis module (2014), an associative module (2016), a generative module (2018), a speaker (2020), a display (2022), a microcontroller (2024), an object analysis module (2026), a media analysis module (2028), a display processing module (2030), and a local database (2032).

The scene analysis module (2002) is configured to identify one or more objects in the image. The object analysis module (2026) is configured to determine one or more visual characteristics and one or more audio characteristics of the identified object. The prioritization module (2004) is configured to assign the priority value to each object based on the corresponding visual characteristics and audio characteristics. The media analysis module (2028) is configured to retrieve, from the local database (2032), one or more external media elements corresponding to the identified objects based on the visual characteristics, the audio characteristics, and the priority values of the identified objects.

The local database (2032) stores a repository of external media elements. The media analysis module (2028) searches the local database (2032) to retrieve the external media elements corresponding to the identified objects. When the external media elements corresponding to the identified images are not found in the local database (2032), the media analysis module (2028) retrieves the elements corresponding to the identified images from an external server (not shown).

Further, the media analysis module (2028) updates the repository of the local database (2032) by storing the external media elements retrieved from the external server in the local database (2032). In an example, the media analysis module (2028) updates the local database (2032) in real-time.

The display processing module (2030) is configured to render the external media elements simultaneously along with the image.

The external media elements include one or more of: the dynamic composite audio file and the external media elements.

In an example, the immersive display system (2000) is functionally similar to the immersive display system (100).

In the immersive display system (2000), the image may be provided along with both: the dynamic composite audio and the external media elements. In this, the image is visually pleasing to the user because of the animated external media objects moving over the display and is pleasing to hear due to the dynamic composite audio.

Figure 21:
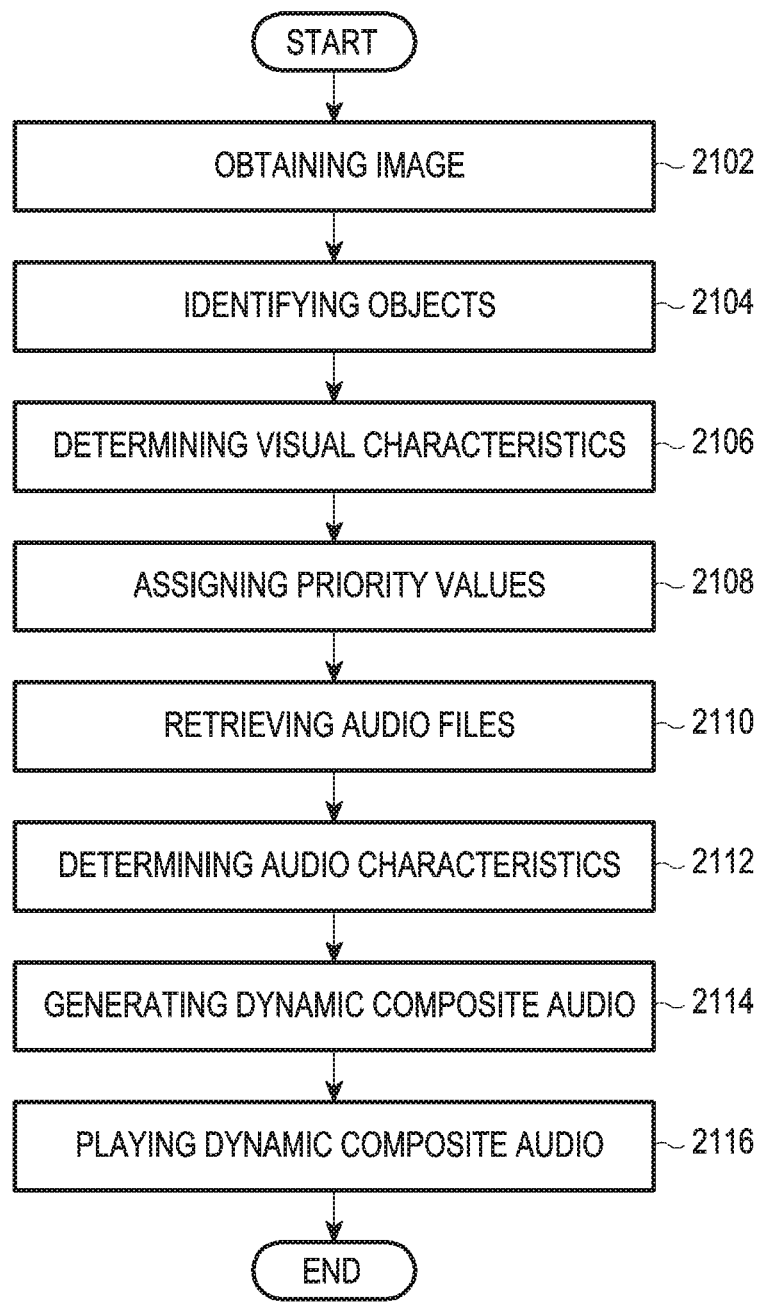
FIG. 21 is a flowchart illustrating an immersive display method according to an embodiment of the disclosure.

FIG. 21 is a flowchart illustrating an immersive display method according to an embodiment of the disclosure.

Referring to FIG. 21, at operation 2102, the scene analysis module (102) obtains the image.

At operation 2104, the scene analysis module (102) identifies the objects in the image.

At operation 2106, the scene analysis module (102) determines the visual characteristics of the identified objects.

At operation 2108, the prioritization module (104) assigns the priority values to the audible objects.

At operation 2110, the audio determination module (106) retrieves the audio files from the database (504).

At operation 2112, the audio determination module (106) determines the audio characteristics of the audio files and stores the audio characteristics in the database (504).

At operation 2114, the audio composition module (108) generates the dynamic composite audio data.

At operation 2116, the speaker (120) plays the dynamic composite audio file while the image is displayed on the screen (122).

Figure 22:
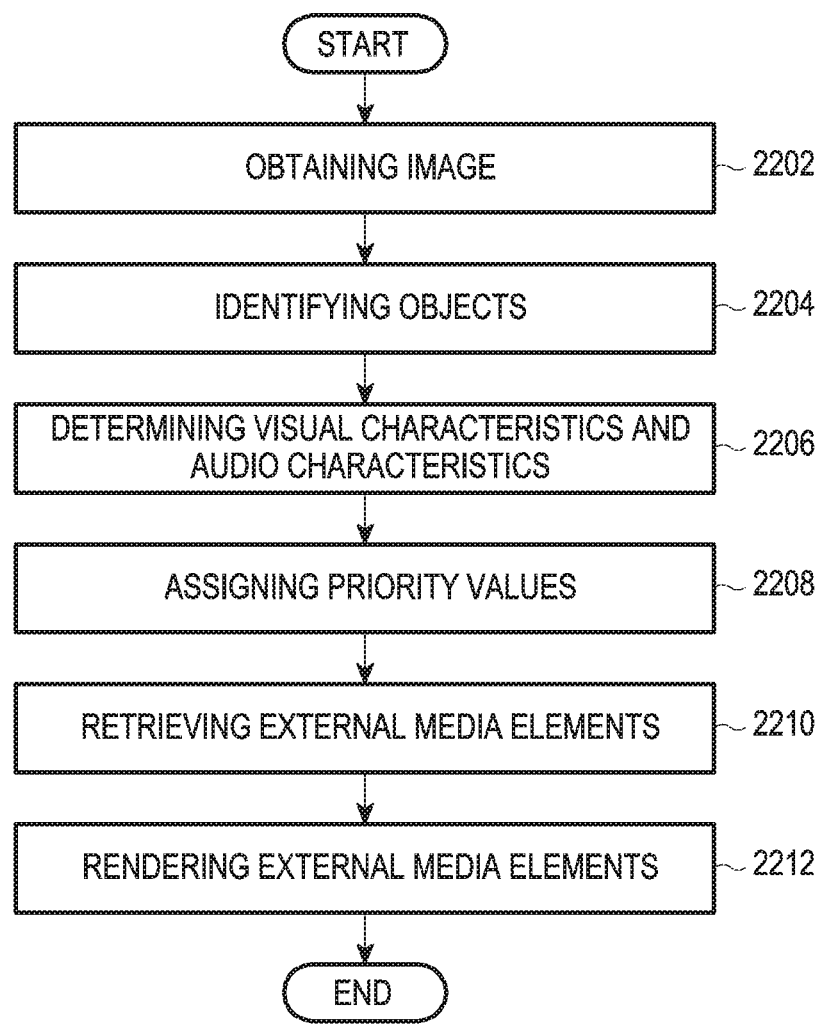
FIG. 22 is a flowchart illustrating an immersive display method according to an embodiment of the disclosure.

FIG. 22 is a flowchart illustrating an immersive display method according to an embodiment of the disclosure.

Referring to FIG. 22, at 2202, the scene analysis module (2002) retrieves the image.

At 2204, the scene analysis module (2002) identifies the objects in the image.

At operation 2206, the object analysis module (2026) determines the audio characteristics and the visual characteristics of the objects.

At 2208, the prioritization module (2004) assigns the priority values to the objects.

At operation 2210, the media analysis module (2028) retrieves the external media elements.

At operation 2212, the display processing module (2030) renders the external media elements on the image.

Figure 23:
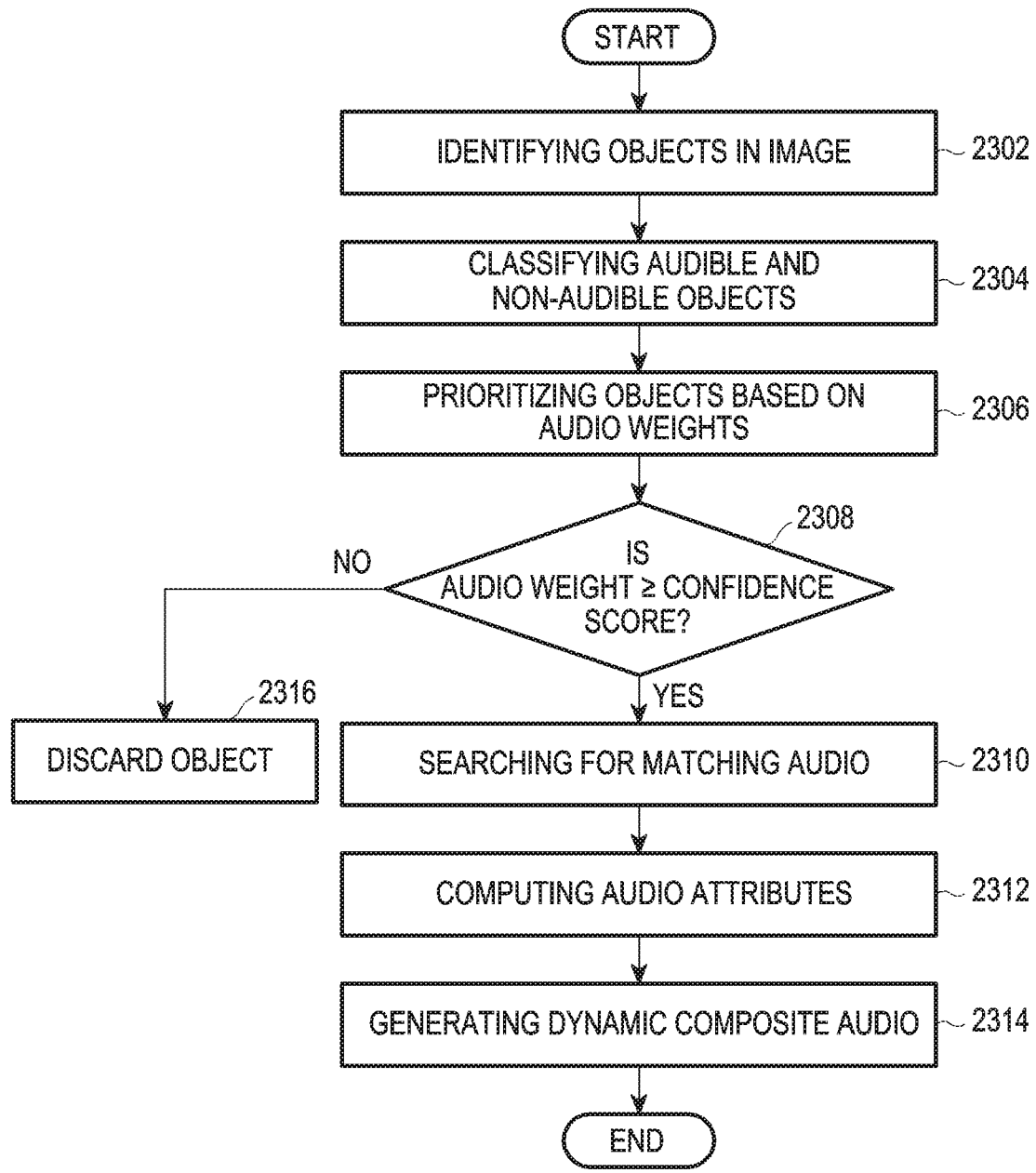
FIG. 23 is a flowchart illustrating a method of generating dynamic composite audio according to an embodiment of the disclosure.

FIG. 23 is a flowchart illustrating a method of generating dynamic composite audio data according to an embodiment of the disclosure.

Referring to FIG. 23, at operation 2302, the scene analysis module (102) identifies the objects in the image.

At operation 2304, the prioritization module (104) classifies the objects into audible and non-audible objects.

At operation 2306, the audio determination module (106) prioritizes the objects based on the audio weights.

At operation 2308, the audio determination module (106) compares the audio weight of an object with the threshold confidence score.

If at operation 2308 the audio determination module (106) determines that the audio weight of an object is greater than or equal to the threshold confidence score, the audio determination module executes operation 2310.

At operation 2310, the audio determination module (106) searches for matching audio files corresponding to the object.

At operation 2312, the audio determination module (106) determines the audio attributes of the retrieved audio files.

At operation 2314, the audio composition module (108) generates the dynamic composite audio.

If at operation 2308 the audio determination module (106) determines that the audio weight of an object is less than the threshold confidence score, the audio determination module executes operation 2316.

At operation 2316, the audio determination module (106) discards the object and checks for next object.

Figure 24:
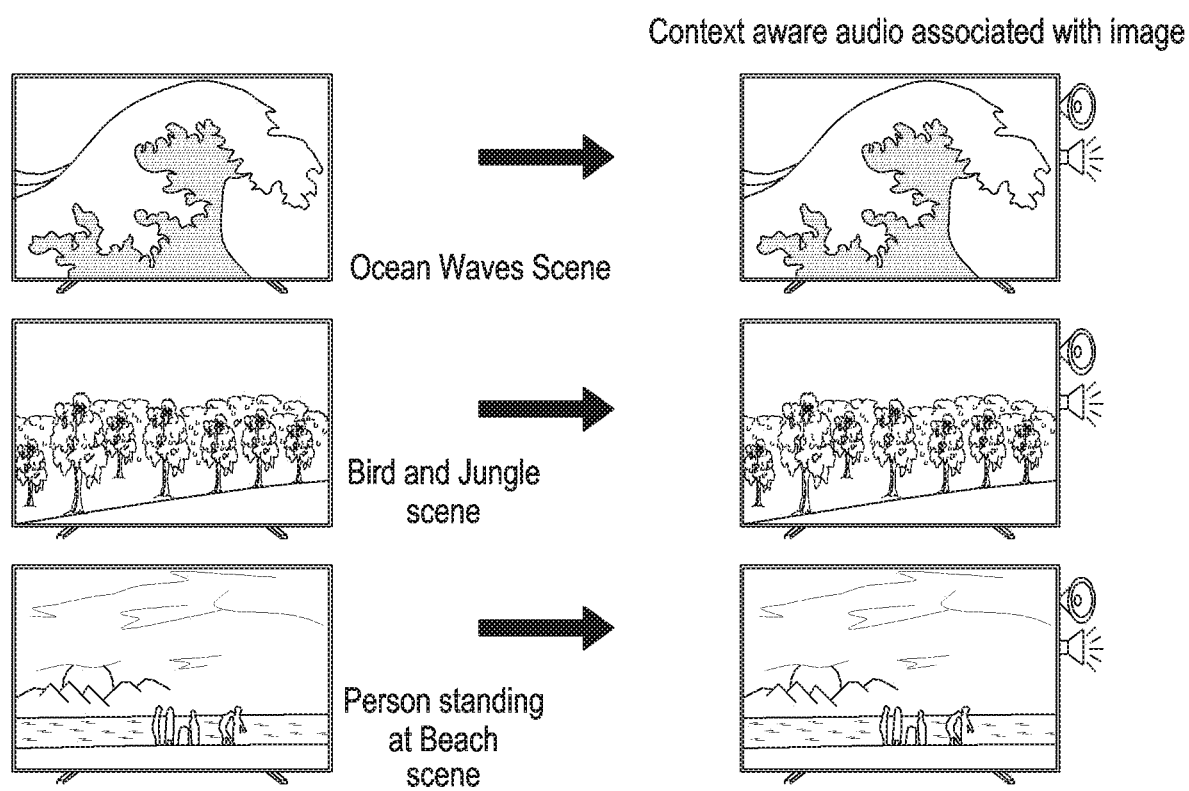
FIG. 24 is a pictorial representation of audio association based on scene analysis according to an embodiment of the disclosure.

FIG. 24 is a pictorial representation of an audio association based on scene analysis according to an embodiment of the disclosure.

Referring to FIG. 24, the immersive display system (100) associates audio based on the scene detected by the scene analysis module (102). When the scene analysis module (102) detects the scene of ocean waves, an audio corresponding to ocean waves is played. When the scene analysis module (102) detects the scene of forests, an audio corresponding to forests is played. When the scene analysis module (102) detects the scene of a person standing at the beach, an audio corresponding to the beach is played.

Figure 25:
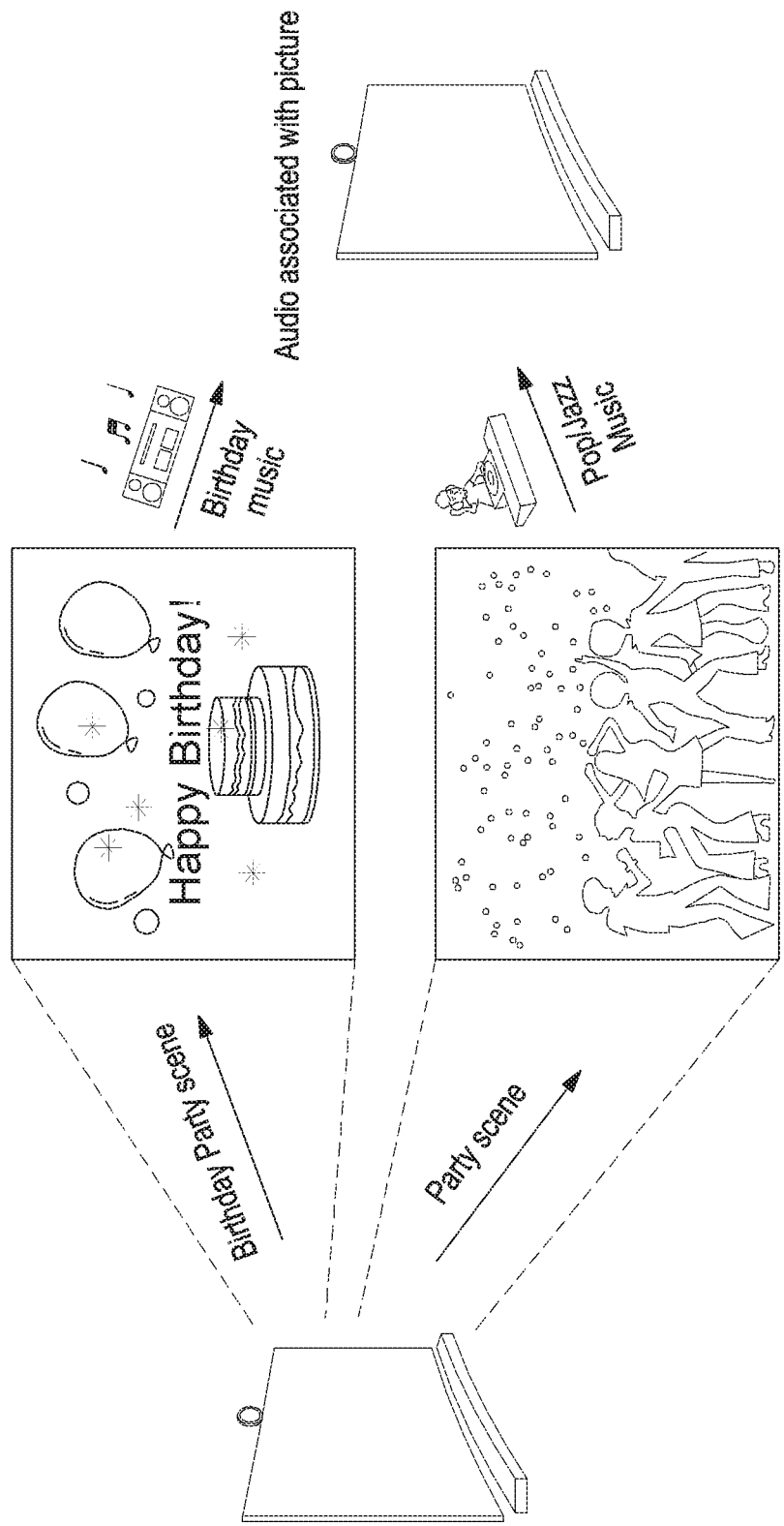
FIG. 25 is a pictorial representation of audio association based on scene analysis according to an embodiment of the disclosure.

FIG. 25 is a pictorial representation of audio association based on scene analysis according to an embodiment of the disclosure.

Referring to FIG. 25, the immersive display system (100) associates audio based on the scene detected by the scene analysis module (102) using the ambience information provided by the ambience analysis module (114). When the scene analysis module (102) detects the scene of a children's birthday party, audio corresponding to birthday parties is played. When the scene analysis module (102) detects the scene of a party, audio corresponding to parties, such as jazz/pop music is played.

Figure 26:
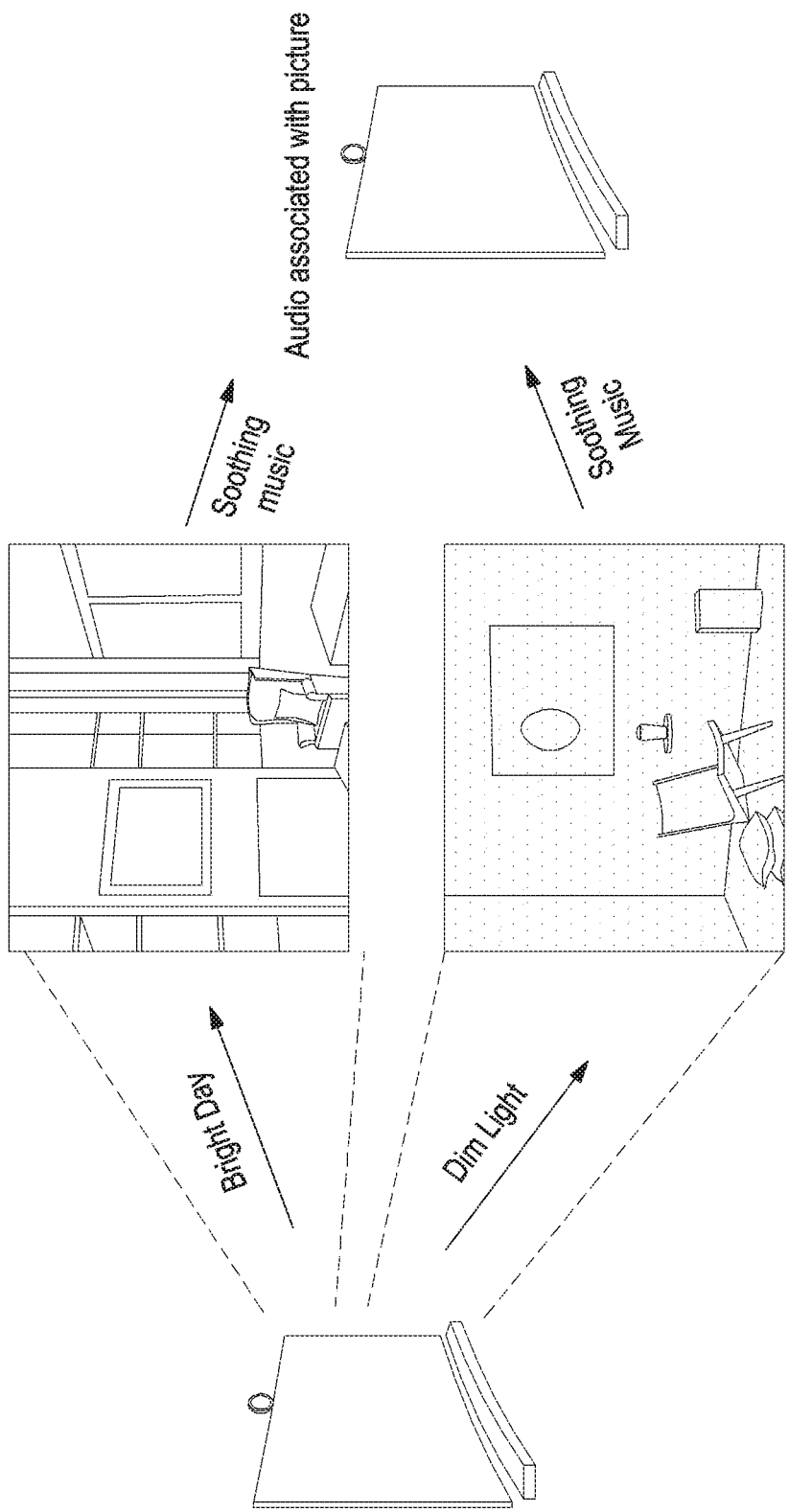
FIG. 26 is a pictorial representation of audio association based on ambience analysis according to an embodiment of the disclosure.

FIG. 26 is a pictorial representation of audio association based on ambience analysis according to an embodiment of the disclosure.

Referring to FIG. 26, the immersive display system (100) associates audio based on the ambience information provided by the ambience analysis module (114). When the ambience analysis module (114) detects a bright day, soothing music is played.

Figure 27:
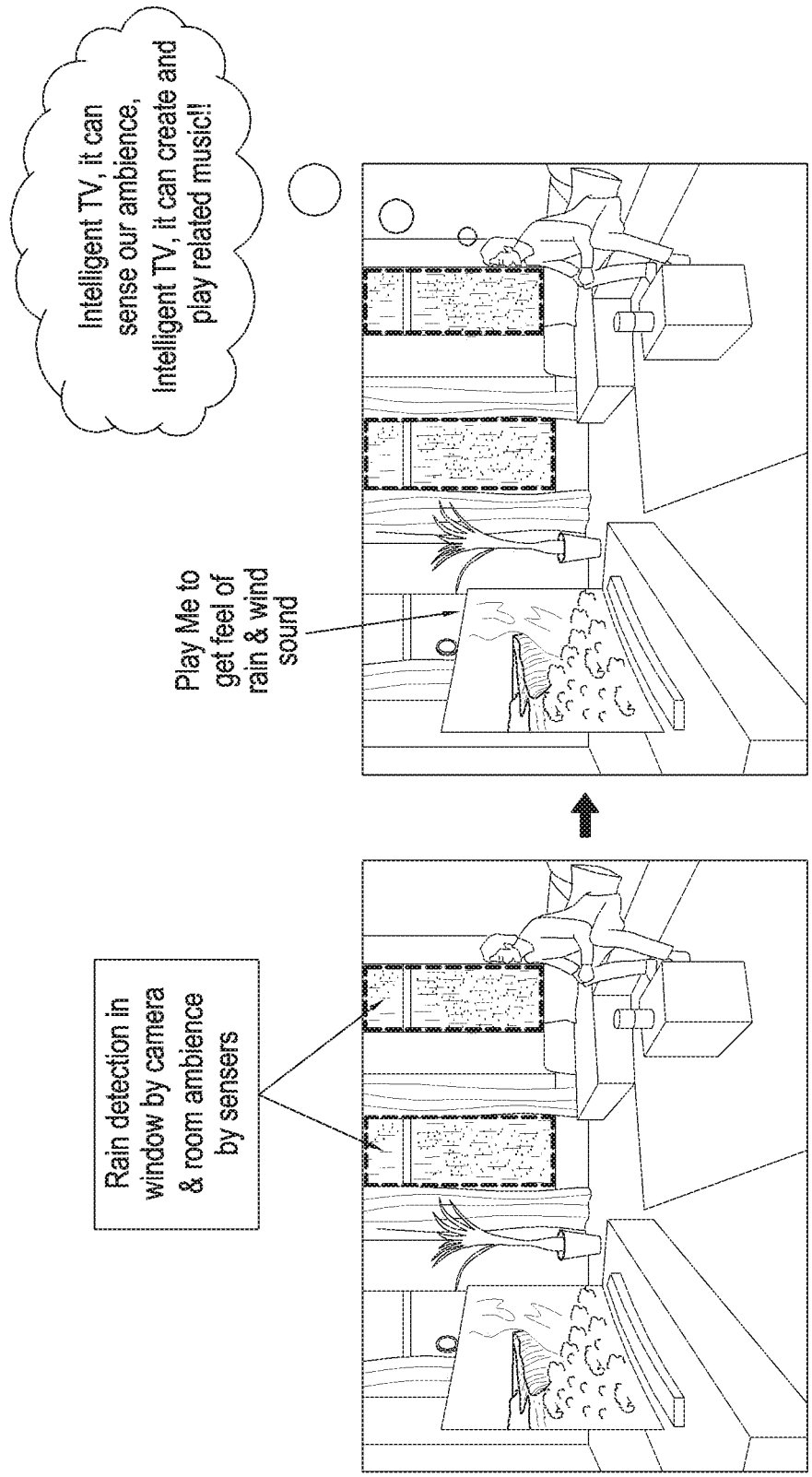
FIG. 27 is a pictorial representation of audio association based on ambience analysis according to an embodiment of the disclosure.

FIG. 27 is a pictorial representation of audio association based on ambience analysis according to an embodiment of the disclosure.

Referring to FIG. 27, the immersive display system (100) associates audio based on the ambience information provided by the ambience analysis module (114). When the ambience analysis module (114) detects a rainy day, audio corresponding to rains or wind is played.

Figure 28:
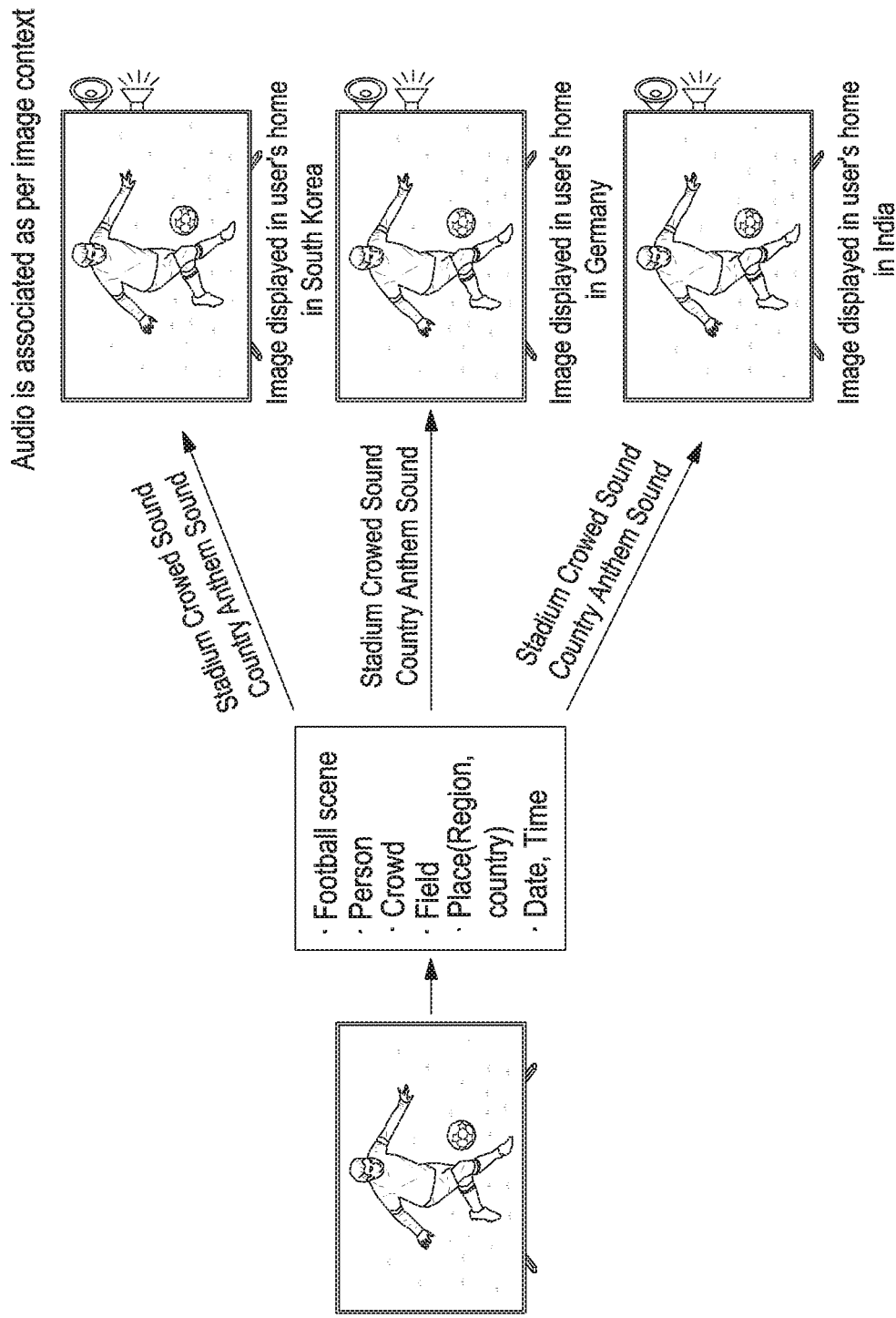
FIG. 28 is a pictorial representation of varied audio association according to an embodiment of the disclosure.

FIG. 28 is a pictorial representation of varied audio association according to an embodiment of the disclosure.

Referring to FIG. 28, the immersive display system (100) associates audio based on the geographical location. For instance, the immersive display system (100) located in India plays Indian national anthem along with the image whereas the immersive display system (100) located in some other country plays that country's national anthem along with the image.

Figure 29:
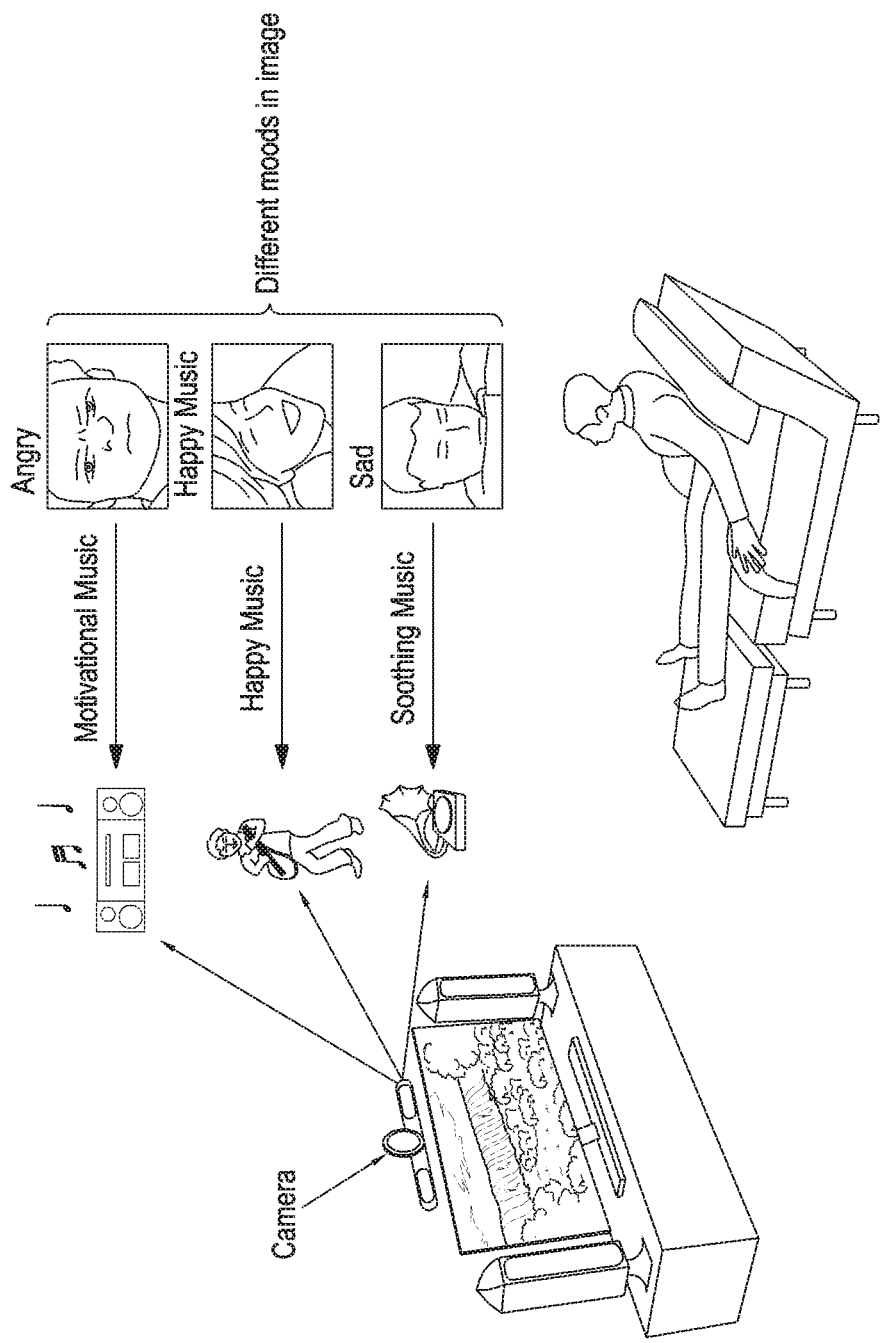
FIG. 29 is a pictorial representation of audio association based on facial expression in according to an embodiment of the disclosure.

FIG. 29 is a pictorial representation of audio association based on facial expression according to an embodiment of the disclosure.

Referring to FIG. 29, the immersive display system (100) plays audio based on the user's facial expression. For instance, when the user's facial expression is that of happiness, the immersive display system (100) plays happy songs. Similarly, when the user's facial expression is that of sadness, the immersive display system (100) plays soothing music. Or when the user's facial expression is that of anger, the immersive display system (100) plays motivational songs.

Figure 30:
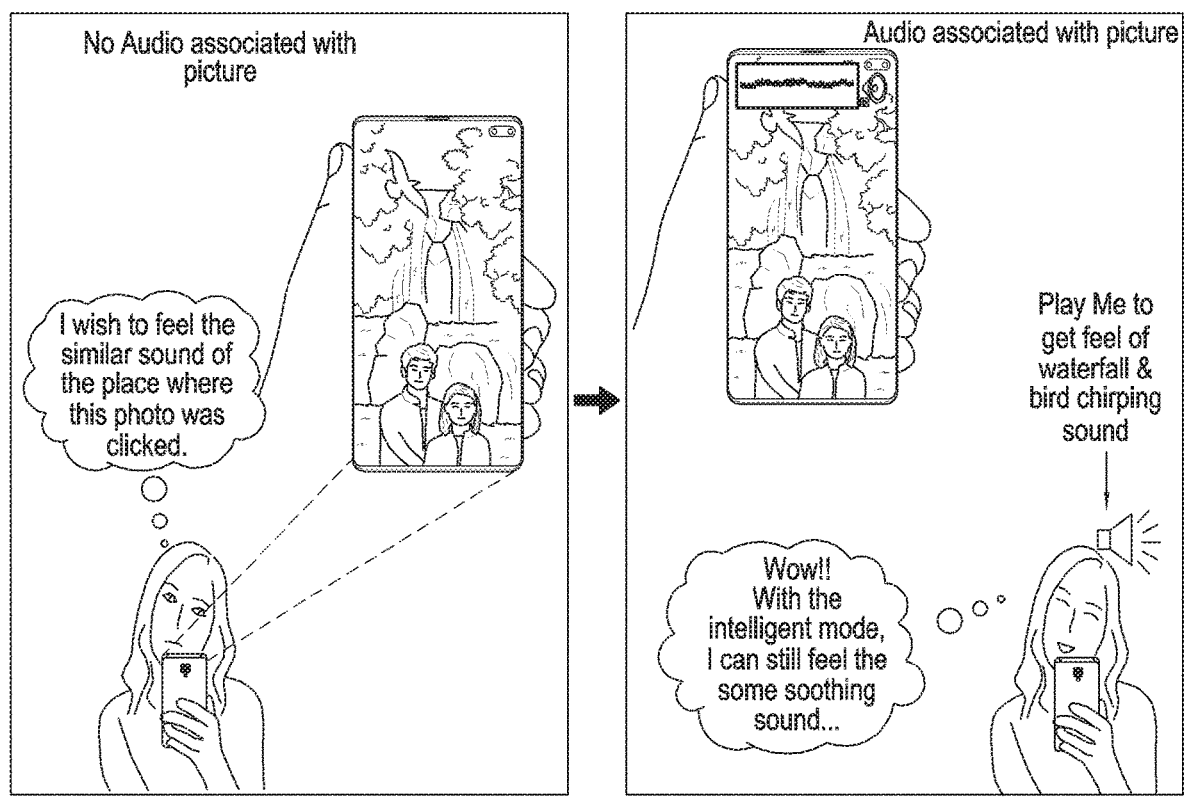
FIG. 30 is a pictorial representation of audio association based on image analysis according to an embodiment of the disclosure.

FIG. 30 is a pictorial representation of audio association based on image analysis according to an embodiment of the disclosure.

Referring to FIG. 30, the immersive display system (100) is implemented on a smartphone. When the user clicks an image displayed on screen of the smartphone, an audio corresponding to that image is played by the smartphone.

Figure 31:
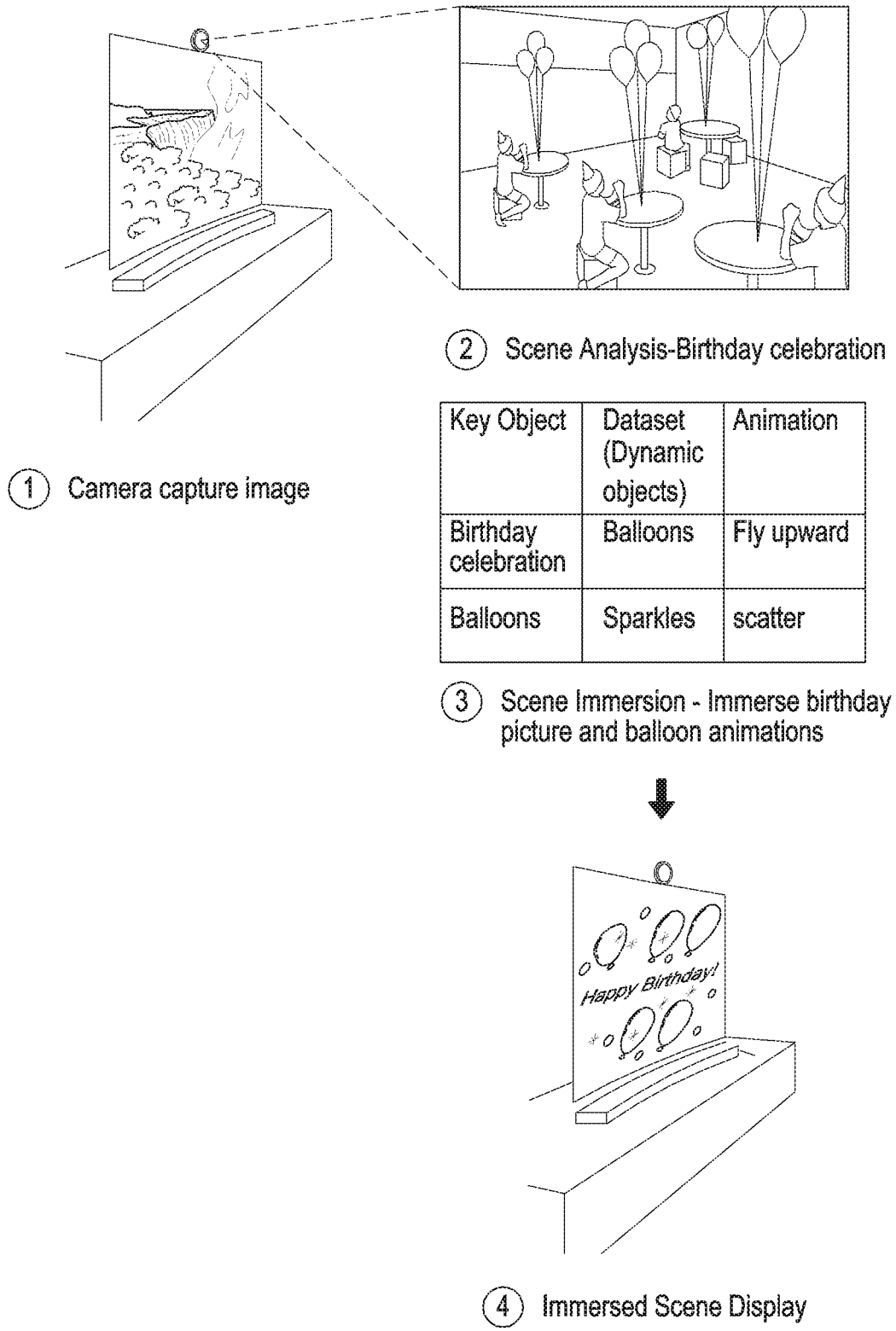
FIG. 31 is a pictorial representation of dynamic object association based on ambience analysis according to an embodiment of the disclosure.

FIG. 31 is a pictorial representation of dynamic object association based on ambience analysis according to an embodiment of the disclosure.

Referring to FIG. 31, the immersive display system (100) selects the dynamic objects based on the ambience information provided by the ambience analysis module (114). Here, the scene analysis module (102) determines that the scene is a birthday party based on the ambience information. Therefore, the immersive display system (100) selects balloons as dynamic objects based on the contextual relevance of balloons, i.e., balloons are widely used in birthday celebrations. Accordingly, the immersive display system (100) displays flying balloons over the image.

Figure 32:
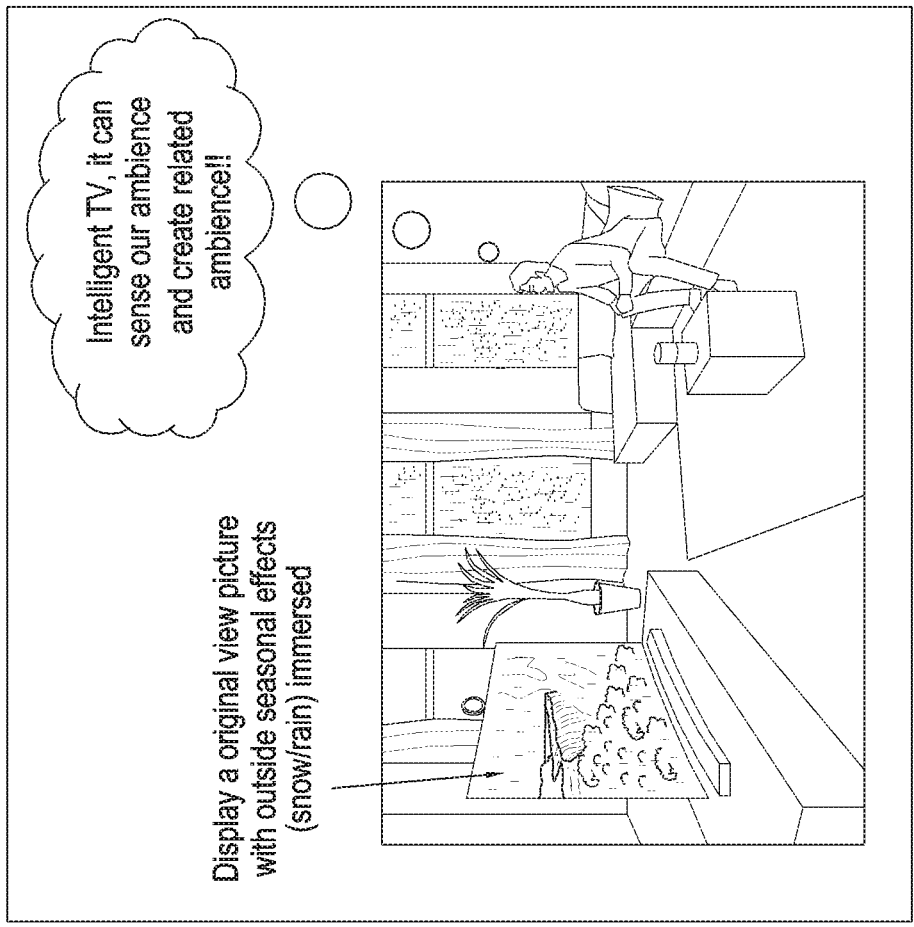
FIG. 32 is a pictorial representation of dynamic object association based on camera inputs according to an embodiment of the disclosure.
Figure 32:
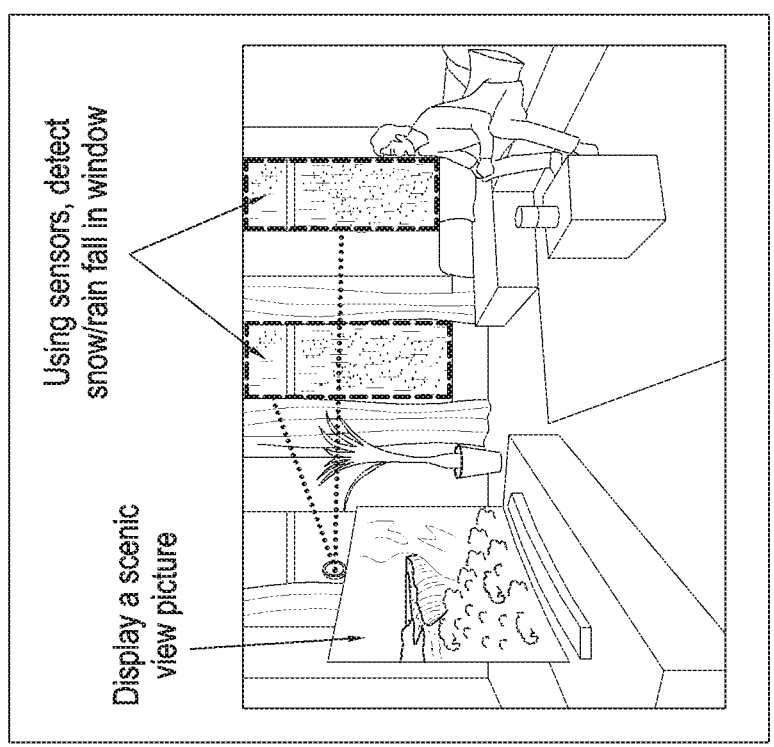

FIG. 32 is a pictorial representation of dynamic object association based on camera inputs according to an embodiment of the disclosure.

Referring to FIG. 32, the immersive display system (100) associates the dynamic objects based on the ambience information provided by the ambience analysis module (114). When the ambience analysis module (114) detects a rainy or winter day, the dynamic objects corresponding to rains (such as water) or winter (such as snowflakes) are displayed.

Figure 33:
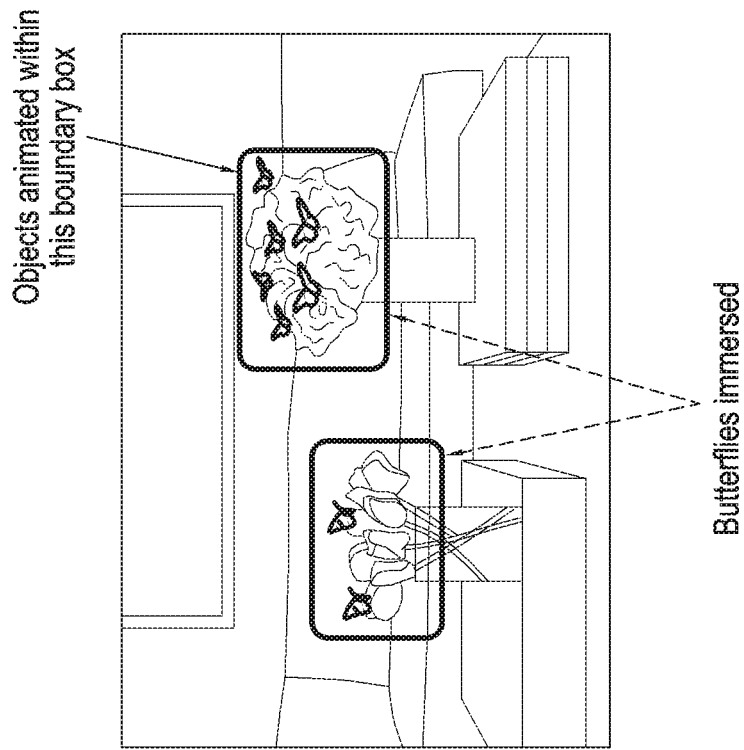
FIG. 33 is a pictorial representation of a method of rendering dynamic objects in a region of interest according to an embodiment of the disclosure.
Figure 33:
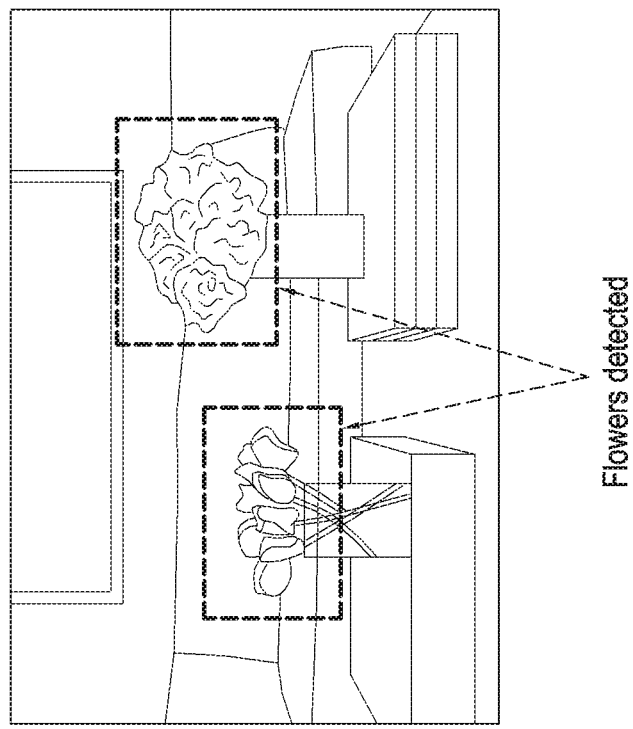

FIG. 33 is a pictorial representation of a method of rendering dynamic objects in a region of interest according to an embodiment of the disclosure.

Referring to FIG. 33, the immersive display system (100) generates flight paths of the dynamic objects as per natural movements of the objects. For instance, the immersive display system (100) displays butterflies as dynamic objects hovering over flowers displayed in the image. Also, the immersive display system (100) may display the butterflies flying from one flower to another so as to mimic movement of butterflies in real world.

Figure 34:
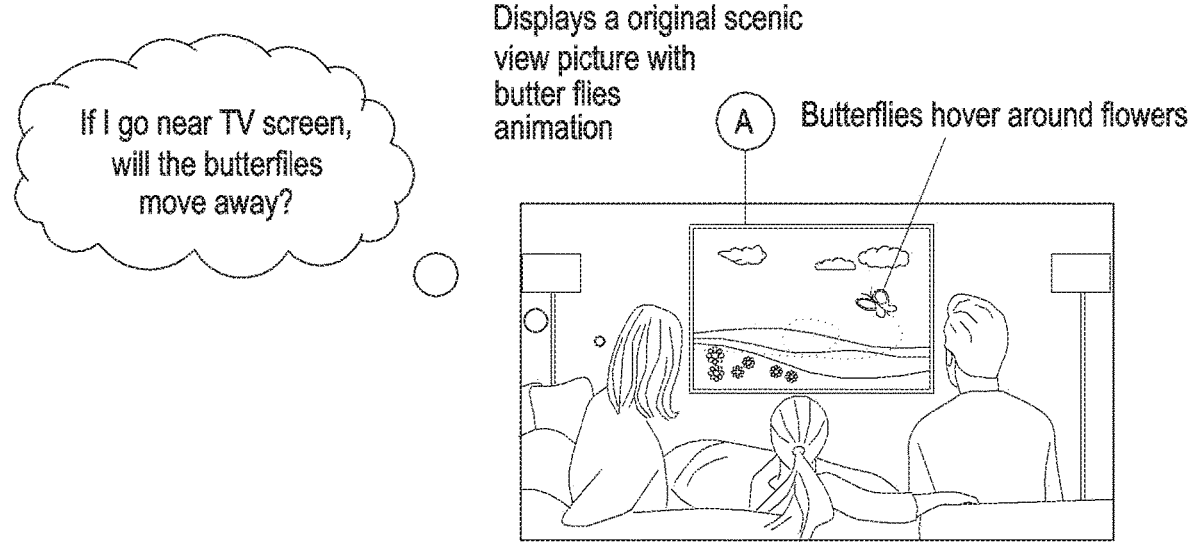
FIG. 34 is a pictorial representation of dynamic object association based on proximity inputs according to an embodiment of the disclosure.

FIG. 34 is a pictorial representation of dynamic object association based on proximity inputs according to an embodiment of the disclosure.

Referring to FIG. 34, the immersive display system (100) modifies the display of the dynamic objects based on proximity of the user to the display (122). For instance, the immersive display system (100) may display that the butterflies disappear when the user comes very close to the display (122).

Figure 35:
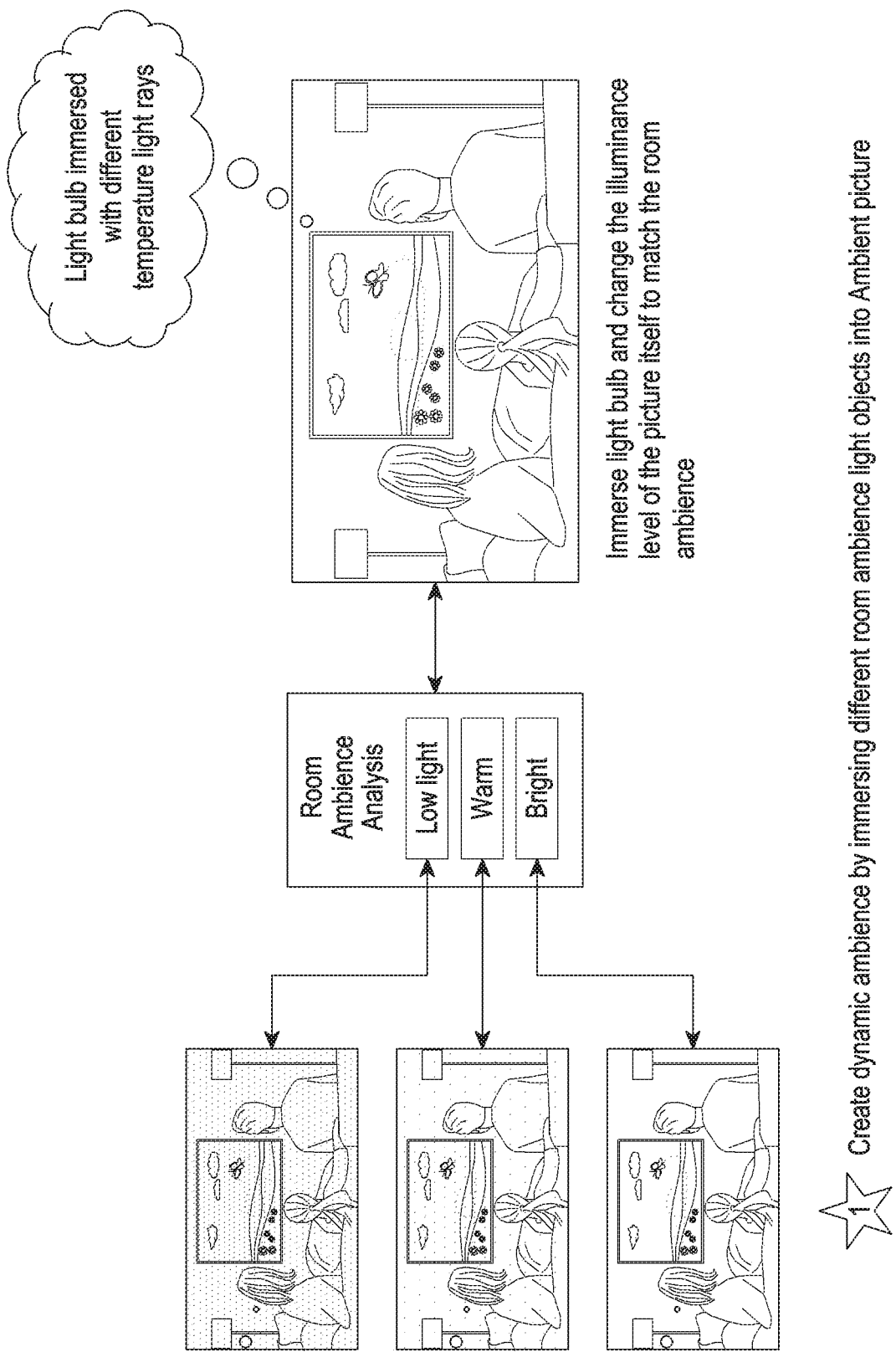
FIG. 35 is a pictorial representation of dynamic object association based on sensor inputs according to an embodiment of the disclosure.

FIG. 35 is a pictorial representation of dynamic object association based on sensor inputs according to an embodiment of the disclosure.

Referring to FIG. 35, the immersive display system (100) associates the dynamic objects based on the ambience information provided by the ambience analysis module (114). When the ambience analysis module (114) determines that the room is well lit, the immersive display system (100) displays a bright light in the image. Similarly, when the ambience analysis module (114) determines that the room is dimly lit, the immersive display system (100) displays a dim light in the image.

Figure 36:
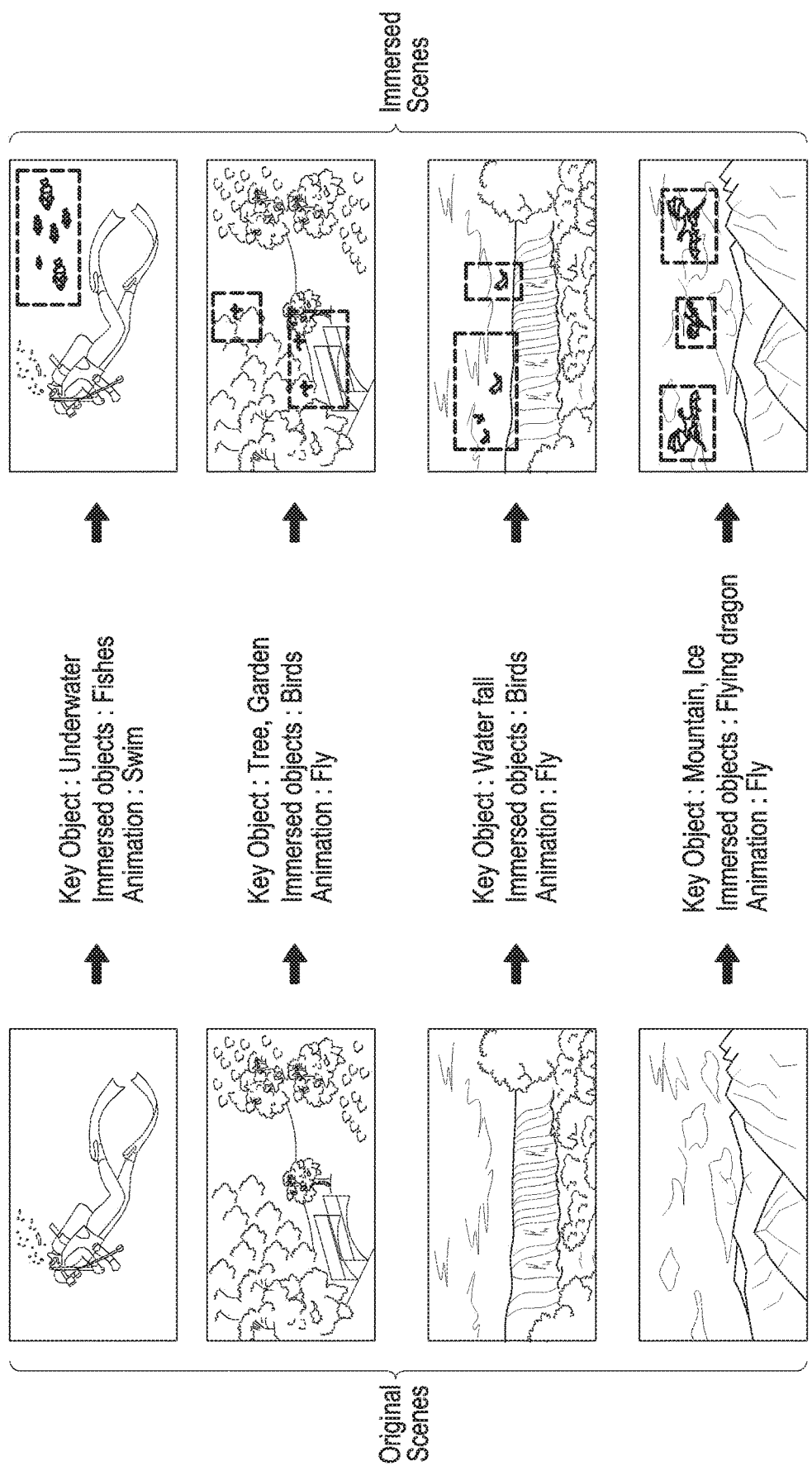
FIG. 36 is a pictorial representation of a method of rendering dynamic objects according to an embodiment of the disclosure.

FIG. 36 is a pictorial representation of a method of rendering dynamic objects according to an embodiment of the disclosure.

Referring to FIG. 36, the immersive display system (100) associates the dynamic objects based on the scene detected by the scene analysis module (102). For instance, when the scene analysis module (102) detects an underwater scene, the immersive display system (100) displays swimming fishes as the dynamic objects. In another instance, when the scene analysis module (102) detects a garden scene, the immersive display system (100) displays flying birds as the dynamic objects. In another instance, when the scene analysis module (102) detects a waterfall scene, the immersive display system (100) displays flying birds as the dynamic objects. In another instance, when the scene analysis module (102) detects a mountain peak scene, the immersive display system (100) displays flying dragons as the dynamic objects.

Figure 37:
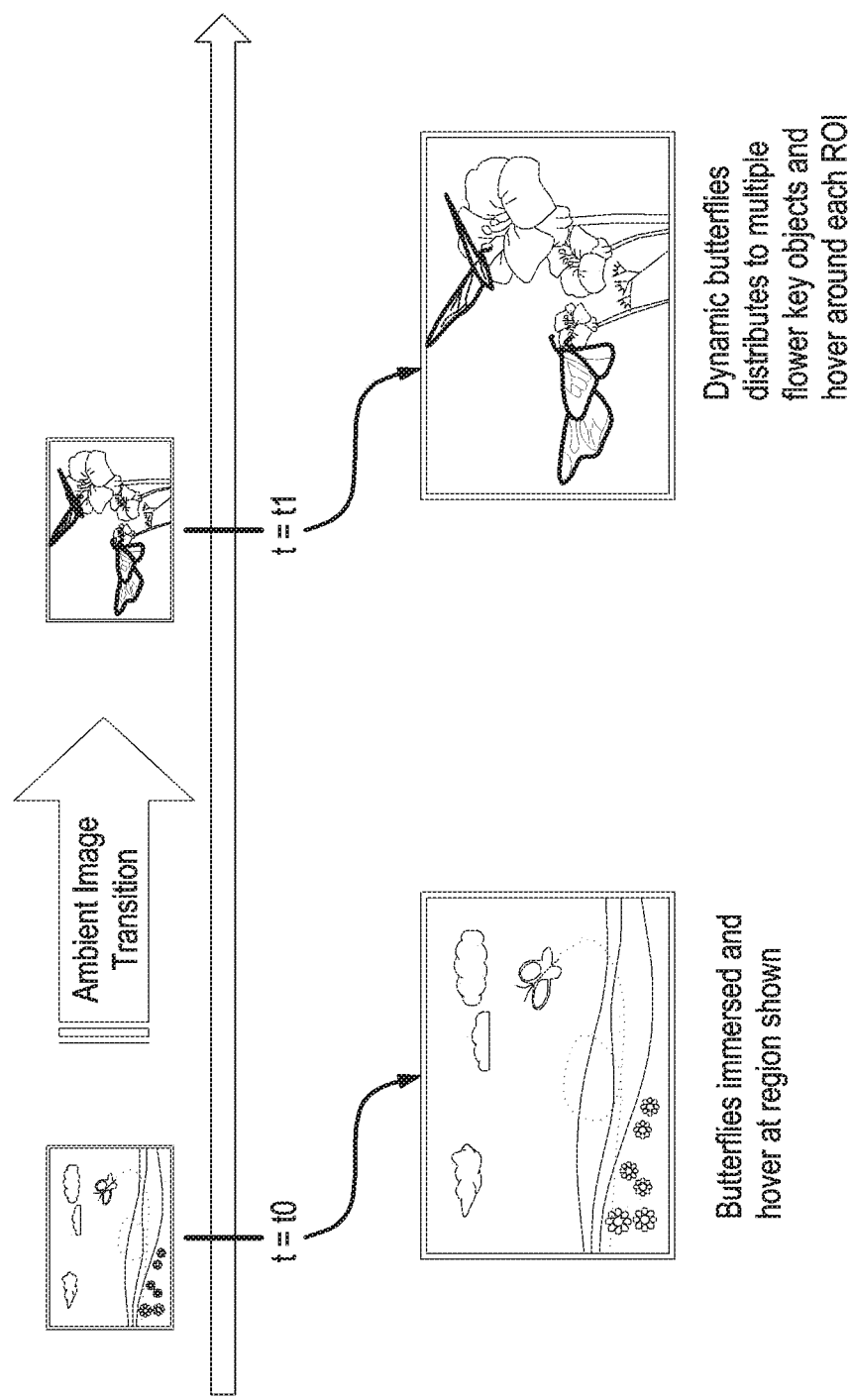
FIG. 37 is a pictorial representation of a method of image transition according to an embodiment of the disclosure.

FIG. 37 is a pictorial representation of a method of image transition according to an embodiment of the disclosure.

Referring to FIG. 37, the immersive display system (100) displays the dynamic objects in multiple regions of interest in the image. For instance, when the image depicts two flower vases, the immersive display system (100) displays flying butterflies as the dynamic objects. Here, the immersive display system (100) displays the flying butterflies over first flower vase at a first time instant and displays the flying butterflies over second flower vase at a second time instant.

It should be noted that the description merely illustrates the principles of the disclosure. It will thus be appreciated that those skilled in the art will be able to devise various arrangements that, although not explicitly described herein, embody the principles of the disclosure.

Furthermore, all examples recited herein are principally intended expressly to be only for explanatory purposes to help the reader in understanding the principles of the and the concepts contributed by the inventor(s) to furthering the art and are to be construed as being without limitation to such specifically recited examples and conditions.

While the disclosure has been shown and described with reference to various embodiments thereof, it will be understood by those skilled in the art that various changes in form and details may be made therein without departing from the spirit and scope of the disclosure as defined by the appended claims and their equivalents. The features described above can be combined in various ways to form multiple variations. As a result, the disclosure is not limited to the specific embodiments described above, but only by the following claims and their equivalents.

What is claimed is:

1. A method of creating immersive content for an electronic device, the method comprising:
   obtaining an image;
   identifying a plurality of objects captured in the image;

classifying the plurality of objects into audible objects and inaudible objects based on whether each of the plurality of objects is capable of generating a sound;

assigning priority values to each audible object from among the audible objects and the inaudible objects, based on corresponding visual characteristics of each audible object and ambience information, wherein the corresponding visual characteristics of each audible object include at least one of an area occupied by the audible object or appearance of the audible object, and the ambience information includes information associated with an external environment of the electronic device determined based on sensor inputs received from one or more sensors of the electronic device;

for each audible object from among the audible objects and the inaudible objects having a priority value above a predetermined threshold, retrieving, from a database storing one or more audio files, a sound corresponding to the audible object;

generating dynamic audio data based on the retrieved sound corresponding to each audible object, the priority values of the audible objects, and the ambience information; and playing the dynamic audio data while displaying the image, wherein the priority values of the audible objects correspond to sound levels of the retrieved sounds corresponding to the audible objects in the image, and wherein the image is one of a plurality of images randomly displayed at the electronic device while in an ambient mode when users are not actively using the electronic device or when a content is not selected to be displayed at the electronic device.

2. The method of claim 1, further comprising:
determining whether a first object of the plurality of objects captured in the image is capable of moving in an external environment;
identifying a region of interest within the image associated with the first object;
generating a flight path within the region of interest associated with the first object; and
rendering the image such that a dynamic object corresponding to the first object appears to move along the flight path.

3. The method of claim 1,
wherein the retrieving of the sound from the database is based on the information associated with the external environment.

4. The method of claim 3,
further comprising receiving, from a camera of the electronic device, the image.

5. The method of claim 1, further comprising:
receiving feedback after the dynamic audio data is played;
re-assigning priority values to the audible objects in the image based on the feedback; and
re-generating the dynamic audio data based on the re-assigned priority values.

6. The method of claim 1,
wherein the database is stored in the electronic device or in an external electronic device.

7. The method of claim 1, further comprising:
determining a scene associated with the plurality of objects identified in the image; and
retrieving, from the database, the sounds corresponding to the audible objects having the priority values above the predetermined threshold based on the scene.

8. The method of claim 1, further comprising playing the dynamic audio data while displaying the image when the electronic device is in the ambient mode.

9. The method of claim 1, wherein the ambience information further includes information associated with one or more of one or more ambient lights, one or more persons in vicinity of a display, one or more objects in vicinity of the display, weather, one or more events, one or more actions of a user, time, time of day, location, or a predetermined schedule.

10. The method of claim 1, wherein an audible object that is likely to be perceived to dominate the dynamic audio data is assigned a higher priority than an audible object that is less likely to be perceived to dominate the dynamic audio data.

11. The method of claim 1, wherein an audible object that appears closer in the image is assigned a higher priority than an audible object that appears farther in the image.

12. The method of claim 1, wherein an audible object having a greater intensity of sound is assigned a higher priority than an audible object having a lower intensity of sound.

13. An electronic device comprising:
a communication interface;
a speaker;
a display; and
at least one processor configured to:
obtain an image,
identify a plurality of objects captured in the image,
classify the plurality of objects into audible objects and inaudible objects based on whether each of the plurality of objects is capable of generating a sound,
assign priority values to each audible object from among the audible objects and the inaudible objects, based on corresponding visual characteristics of each audible object and ambience information, wherein the corresponding visual characteristics of each audible object include at least one of an area occupied by the audible object or appearance of the audible object, and the ambience information includes information associated with an external environment of the electronic device determined based on sensor inputs received from one or more sensors of the electronic device,
for each audible object from among the audible objects and the inaudible objects having a priority value above a predetermined threshold, retrieve, from a database storing one or more audio files, a sound corresponding to the audible object,
generate dynamic audio data based on the retrieved sound corresponding to each audible object, the priority values of the audible objects, and the ambience information, and
control the speaker to output the dynamic audio data while controlling the display to display the image,
wherein the priority values of the audible objects correspond to sound levels of the retrieved sounds corresponding to the audible objects in the image, and
wherein the image is one of a plurality of images randomly displayed at the electronic device while in an ambient mode when users are not actively using the electronic device or when a content is not selected to be displayed at the electronic device.

14. The electronic device of claim 13, wherein the at least one processor is further configured to:

determine whether a first object of the plurality of objects captured in the image is capable of moving in an external environment, identify a region of interest within the image associated with the first object, generate a flight path within the region of interest associated with the first object, and render the image such that a dynamic object corresponding to the first object appears to move along the flight path.

15. The electronic device of claim 13, wherein the retrieving of the sound from the database is based on the information associated with the external environment.

16. The electronic device of claim 15, further comprising receiving, from a camera of the electronic device, the image.

17. The electronic device of claim 13, wherein the at least one processor is further configured to:

receive feedback after the dynamic audio data is played;

re-assign priority values to the audible objects in the image based on the feedback; and re-generate the dynamic audio data based on the re-assigned priority values.

18. The electronic device of claim 13, wherein the at least one processor is further configured to retrieve, from the database, the sounds corresponding to the audible objects having the priority values above the predetermined threshold from a database, and wherein the database is stored in the electronic device or in an external electronic device.

19. The electronic device of claim 13, wherein the at least one processor is further configured to:

determine a scene associated with the plurality of objects identified in the image, and retrieve, from the database, the sounds corresponding to the audible objects having the priority values above the predetermined threshold based on the scene.

20. The electronic device of claim 13, wherein the dynamic audio data is played and the image is displayed when the electronic device is in the ambient mode.

* * * * *